United States Patent [19]

Baum et al.

[11] Patent Number: 5,023,773

[45] Date of Patent: Jun. 11, 1991

[54] AUTHORIZATION FOR SELECTIVE PROGRAM ACCESS TO DATA IN MULTIPLE ADDRESS SPACES

[75] Inventors: Richard I. Baum; Terry L. Borden, both of Poughkeepsie; Justin R. Butwell, Milton; Carl E. Clark, Poughkeepsie; Alan G. Ganek, Chappaqua, all of N.Y.; James Lum, Redwood City, Calif.; Michael G. Mall, Lagrangeville, N.Y.; David R. Page, Romsey, United Kingdom; Kenneth E. Plambeck; Casper A. Scalzi, both of Poughkeepsie, N.Y.; Richard J. Schmalz, Wappingers Falls, N.Y.

[73] Assignee: International Business Machines Corporation, Armonk, N.Y.

[21] Appl. No.: 154,740

[22] Filed: Feb. 10, 1988

[51] Int. Cl.⁵ ............................................. G06F 12/14
[52] U.S. Cl. ................................. 364/200; 364/286.4; 364/286.5; 364/261.2; 364/246.7
[58] Field of Search .................... 364/200, 900, 300

[56] References Cited

U.S. PATENT DOCUMENTS

| | | | |
|---|---|---|---|
| 3,787,813 | 1/1974 | Cole et al. | 364/200 |
| 4,037,214 | 7/1977 | Birney et al. | 364/200 |
| 4,044,334 | 7/1977 | Bachman et al. | 364/200 |
| 4,096,573 | 7/1978 | Heller et al. | 364/200 |
| 4,104,721 | 8/1978 | Markstein et al. | 364/200 |
| 4,136,385 | 1/1979 | Gannon et al. | 364/200 |
| 4,268,903 | 5/1981 | Miki et al. | 364/200 |
| 4,297,743 | 10/1981 | Appell et al. | 364/200 |
| 4,355,355 | 10/1982 | Butwell et al. | 364/200 |
| 4,366,536 | 12/1982 | Kohn | 364/200 |
| 4,366,537 | 12/1982 | Heller et al. | 364/200 |
| 4,430,705 | 2/1984 | Cannavino et al. | 364/200 |
| 4,434,464 | 2/1984 | Suzuki et al. | 364/200 |
| 4,454,580 | 6/1984 | Page et al. | 364/200 |
| 4,455,602 | 6/1984 | Baxter, III et al. | 264/200 |
| 4,490,787 | 12/1984 | Ohya et al. | 364/200 |
| 4,500,952 | 2/1985 | Heller et al. | 364/200 |
| 4,521,846 | 6/1985 | Scalzi et al. | 364/200 |
| 4,677,546 | 6/1987 | Freeman et al. | 364/200 |
| 4,731,734 | 3/1988 | Gruner et al. | 364/200 |
| 4,763,244 | 8/1988 | Moyer et al. | 364/200 |
| 4,763,250 | 8/1988 | Keshlear et al. | 364/200 |
| 4,787,031 | 11/1988 | Karger et al. | 364/200 |
| 4,809,160 | 2/1989 | Mahon et al. | 364/200 |
| 4,821,169 | 4/1989 | Sites et al. | 364/200 |
| 4,866,599 | 9/1989 | Morganti et al. | 364/200 |

OTHER PUBLICATIONS

IBM Technical Disclosure Bulletin-vol. 24, No. 8, Jan. 1982 pp. 4401-4403 Entitled "Method of Revoking a Capability Containing a Pointer-Type Identifier Without Accessing the Capability" by K. E. Plambeck.
"IBM System/370 Extended Architecture—Principles of Operation" Manual-Publication No. SA22-7085-1.

Primary Examiner—Thomas C. Lee
Attorney, Agent, or Firm—Floyd A. Gonzalez

[57] ABSTRACT

A program authorization mechanism for authorizing access to an address space in the main memory of a computer system by a program being run under a multiple address space facility. An access-list entry is associated with each address space, each access-list entry being designated by an access-list-entry token contained in an access register. Each access-list entry includes a private indicator which indicates if the associated address space can be accessed by all programs from this access-list entry or if the associated address space can only be accessed by an authorized program. For program to be authorized, an extended authorization index in a control register must match an access-list extended authorization index in the access-list entry, or the extended authorization index value must be authorized in an authority table associated with the address space. An instruction for testing a given extended authorization index for a given access-list-entry is also disclosed.

49 Claims, 14 Drawing Sheets

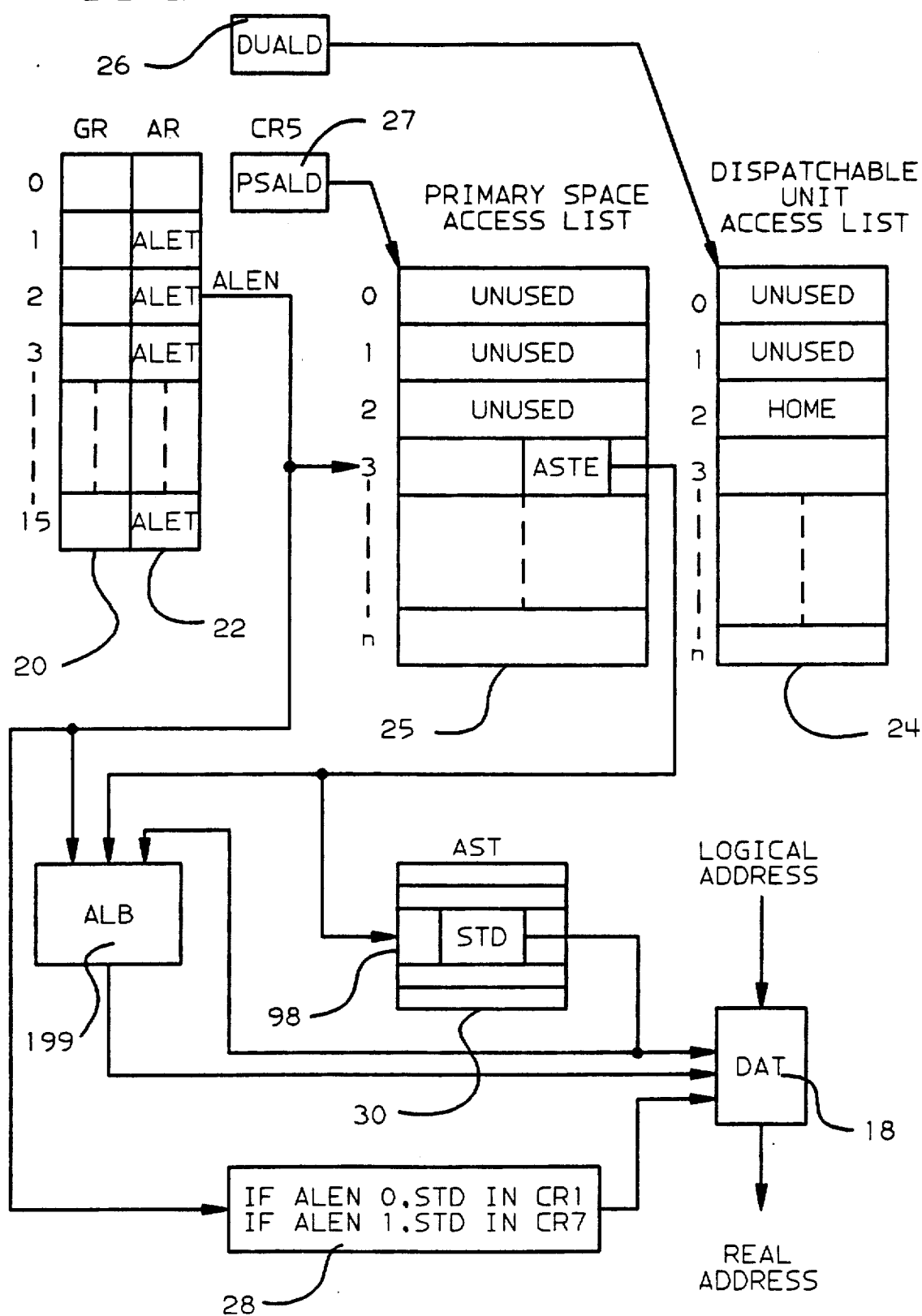

FIG. 3

CONTROL REGISTERS

| REG. NO. | Contents |
|---|---|
| 0 | M at bit 15 |
| 1 | PRIMARY SEGMENT-TABLE DESIGNATION (PSTD): X(0) \| PSTO (1-20) \| PSTL (25) |
| 2 | DISPATCHABLE-UNIT-CONTROL-TABLE ORIGIN (DUCTO) (0-26) |
| 3 | PSW KEY MASK (PKM) (0-15) \| SECONDARY-ADDRESS-SPACE NUMBER (SASN) (16-31) |
| 4 | AUTHORIZATION INDEX (AX) (0-15) \| PRIMARY-ADDRESS-SPACE NUMBER (PASN) (16-31) |
| 5 | 0 \| PRIMARY-ASTE ORIGIN (PASTEO) (1-26) |
| 6 | |
| 7 | SECONDARY SEGMENT-TABLE DESIGNATION (SSTD): 0 \| SSTO (1-20) \| SSTL (25) |
| 8 | EXTENDED AUTHORIZATION INDEX (EAX) (0-15) |
| 9 | |
| 10 | |
| 11 | |
| 12 | |
| 13 | HOME SEGMENT-TABLE DESIGNATION (HSTD): X(0) \| HSTO (1-20) \| HSTL (25) |
| 14 | T (12) \| ASN-FIRST-TABLE ORIGIN (AFTO) (20-31) |
| 15 | 0 \| LINKAGE-STACK-ENTRY ADDRESS (1-28) |

FIG.5

ACCESS-LIST-ENTRY TOKEN (ALET)

| 0000000 | P | ALESN | ALEN |
|---|---|---|---|
| 0 | 7 8 | 16 | 31 |

FIG.6  ACCESS-LIST ENTRY (ALE)

| I | | P | ALESN | ACCESS LIST EXTENDED AUTHORIZATION INDEX (ALEAX) | |
|---|---|---|---|---|---|
| 1 | | 7 8 | 16 | 32 | 63 |

| | ASTE ADDRESS | | ASTE SEQ. NO. (ASTESN) |
|---|---|---|---|
| 65 | | 90 96 | 127 |

FIG.7  LINKAGE-TABLE ENTRY (LTE)

| I | 0000000 | ETO | ETL |
|---|---|---|---|
| 1 | 8 | | 26  31 |

FIG.8  ENTRY-TABLE ENTRY (ETE)

| AUTH KEY MASK (AKM) | EASN | A | INSTRUCTION ADDRESS (EIA) | P |
|---|---|---|---|---|
| 0 | 16 | 32 | | 63 |

| ENTRY PARAMETER | ENTRY KEY MASK (EKM) | |
|---|---|---|
| 64 | 96 | 112  127 |

| T | K | M | E | C | S | EK | ENTRY EAX | ASTE ADDRESS | |
|---|---|---|---|---|---|---|---|---|---|
| 128 | 131 | | | 136 | 140 | 144 | 160 | | 186 |

FIG. 9
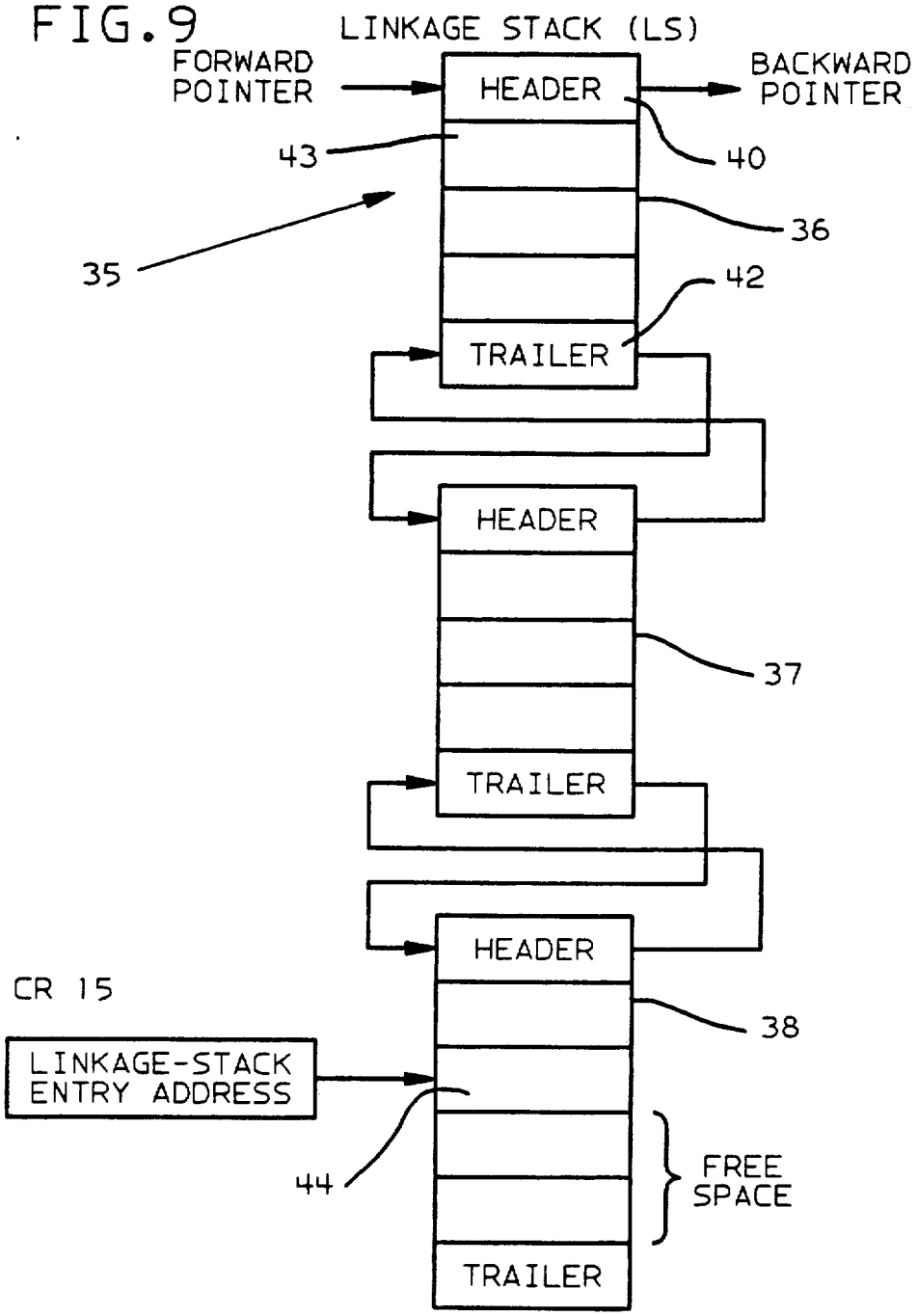
FIG. 10  LS-STATE ENTRY
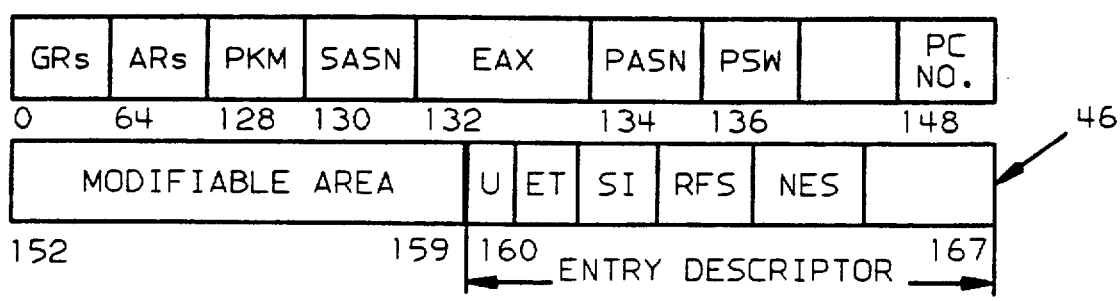

| BYTE (DEC) | DISPATCHABLE-UNIT-CONTROL TABLE (DUCT) |
|---|---|
| 0<br>4<br>8<br>12 | |
| 16 | DUALD<br>0 \| 1  ACCESS-LIST ORIGIN  \| ALL<br>           25    31 |
| 20<br>24 | |
| 28 | ///////////////////////////// |
| 32<br>{<br>60 | |

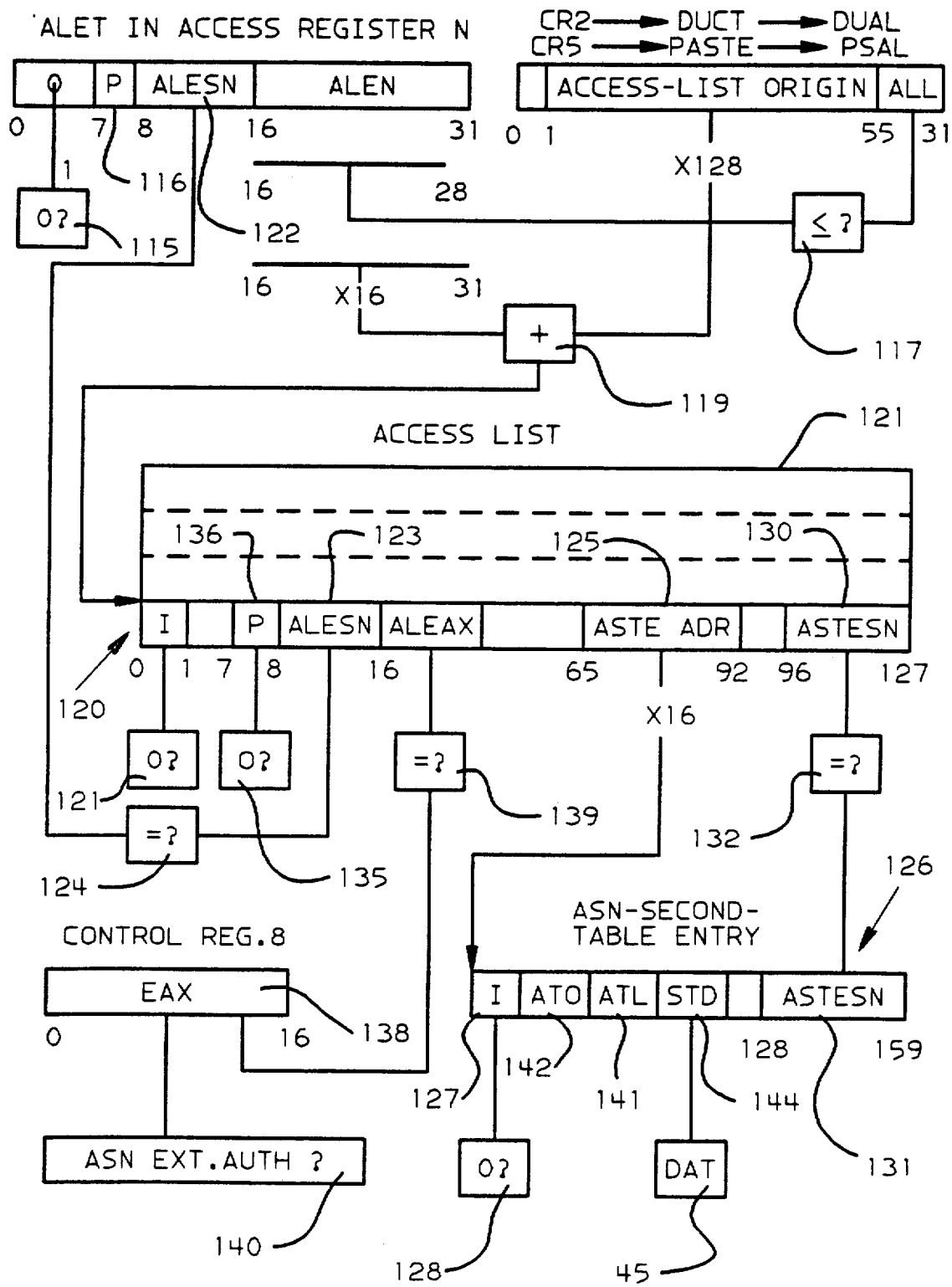
FIG.18 ACCESS-REGISTER TRANSLATION (ART)

AUTHORIZATION FOR SELECTIVE PROGRAM ACCESS TO DATA IN MULTIPLE ADDRESS SPACES

CROSS-REFERENCE TO RELATED APPLICATIONS

This application contains subject matter which is related to the subject matter of the following applications filed on even date herewith and assigned to the same assignee:

"Access Register Translation Means for Address Generating Mechanism for Multiple Virtual Spaces" by R. I. Baum et al, Ser. No. 07/154,687; "Linkage Mechanism For Program Isolation" by R. I. Baum et al, Ser. No. 07/154,733; "Domain Related Access Lists" by C. E. Clark et al, Ser. No. 07/154,685, now U.S. Pat. No. 4,945,480; "Home Facility" by C. E. Clark, Ser. No. 07/154,780, now U.S. Pat. No. 4,943,913; and "Control Mechanism for Zero-Origin Data Spaces" by C. A. Scalzi et al, Ser. No. 07/154,688.

BACKGROUND OF THE INVENTION

The present invention relates to an authorization mechanism for a multiple virtual system (MVS) which provides authorization for a program being executed in a data processing system such that the program has concurrent access to multiple virtual address spaces, and more particularly relates to such an authorization mechanism wherein the authorization is nonhierarchical, that is, the called program does not have to have an equal or higher authority than the calling program.

Data processing systems using virtual addressing in multiple virtual address spaces, such as the IBM System/370 Systems using MVS controlled programming, are well known. The organization and hardware/architectural aspects of the IBM System/370 are described in the "IBM System/370 Principles of Operation", form number SA22-7085-1. The described MVS system includes a central processing unit (CPU) which contains the sequencing and processing facilities for instruction execution, interruption action, timing functions, initial program loading, and other machine-related functions. Also included is a main storage, which is directly addressable and provides for high-speed processing of data by the CPU. The main storage may be either physically integrated with the CPU or constructed in stand-alone units.

Located in a register in the machine is a program-status word (PSW) which includes the instruction address and other information used to control instruction sequencing and to determine the state of the CPU. Instructions may designate information in one or more of 16 general registers which may be used as base-address registers and index registers in address arithmetic and as accumulators in general arithmetic and logical operations. The general registers are identified by the numbers 0-15 and are designated by a four bit register field in an instruction. Some instructions provide for addressing multiple general registers by having several register fields.

The CPU has provision for 16 control registers, each having 32 bit positions. The bit positions in the control registers are assigned to particular facilities in the system, such as program-event recording, and are used either to condition or constrain operations or to furnish special information required by the facility.

U.S. Pat. No. RE. 27,251 to G. M. Amdahl for "Memory Protection System", assigned to the Assignee of the present invention, discloses a four bit coded storage protect key associated with physical blocks of memory. The protect key is compared with a PSW key associated with a program to control access to data.

U.S. Pat. No. 4,096,573 to A. R. Heller et al for "DLAT Synonym Control Means for Common Portions of All Address Spaces" and U.S. Pat. No. 4,136,385 to P. M. Gannon et al for "Synonym Control Means for Multiple Virtual Storage Systems" both assigned to the Assignee of the present invention, disclose MVS systems in which the main storage may be allocated as address spaces for use by multiple users, each address space containing a portion defined as common among all of the users. The result is that a user may isolate programs or data from other users by placing them in a "private" portion of the user's assigned address space, or he may make them accessible to all other users by placing the programs or data in "common". In such a system, data may be moved between two address spaces by having a program in the first address space move the data from its private area into common and then signal a program in the other address space to operate on, or further move, the data. The use of common as a communication area between address spaces increases the size of the common area and thus reduces the size of the private area available to all users. Signalling from one program to another can only be done by subsystems or the control program. Data is protected by storage protect keys. However, there are only 16 such keys, which are not enough to guarantee that the information is protected from an inadvertent store by another subsystem or authorized program since the information is commonly addressable.

U.S. Pat. No. 4,355,355 to Butwell et al for "Address Generating Mechanism for Multiple Virtual Spaces", assigned to the Assignee of the present invention, discloses access registers (ARs) associated with the general purpose registers (GPRs) in a data processor. The ARs may each be loaded with an address space identifier, for example, a unique segment table designation (STD). There may be 16 ARs associated respectively with the 16 GPRs in a processor. The address space identifier in an AR is selected for address translation when the associated GPR is selected as a storage operand base register, such as being the GPR selected by the B field in an IBM System/370 instruction. However, the address space identifier content of a AR is not selected for an address translation if the associated GPR is selected for a purpose other than as a storage operand base register, such as if a GPR is selected as an index (X) register or as a data source or sink register (R) for an instruction. The disclosed invention also contains authority for each program's access to each address space by also associating an AR control vector (ARCV) register with each AR to control the type of access permitted to the associated address space by an executing program. A special field in either an AR or its associated ARCV may indicate whether the AR content is enabled and thereby contains a usable address space identifier; or is disabled such that the address space identifier must be obtained elsewhere. This special field with each AR permits the GPR of any disabled AR to specify a base value associated with the address space defined by another AR; i.e. the GPR of a disabled AR may specify a base address for data in the program address space defined by AR0.

U.S. Pat. No. 4,430,705 to Cannavino et al for "Authorization Mechanism for Establishing Addressability to Information in Another Address Space", assigned to the Assignee of the present invention, discloses an enhancement to the previous MVS systems. A dual address space (DAS) system is disclosed (see also U.S. Pat. Nos. 4,366,537 and 4,500,952) in which problem programs have the ability to obtain addressability to a different address space if permitted by an authority table associated with the different address space. As with the previous MVS systems, the disclosed DAS system makes use of control registers, general registers, and a PSW. A bit in the PSW is assigned to indicate the DAS mode of operation.

DAS makes two address spaces, a primary address space and a secondary address space, available for use by a semiprivileged program. Three instructions are added for moving information. The MOVE TO PRIMARY (MVCP) instruction moves data from the secondary address space to the primary address space, the MOVE TO SECONDARY (MVCS) instruction moves data from the primary address space to the secondary address space, and the MOVE WITH KEY (MVCK) instruction moves data between differently protected areas in the same address space. The CPU can be in the primary mode in which instructions and the operand addresses defined to be logical refer to the primary address space, or in the secondary mode in which the operand addresses defined to be logical refer to the secondary address space. However, in the secondary mode, it is unpredictable whether instructions are fetched from the primary address space or from the secondary address space. Thus, programs executed in the secondary mode are placed in a common portion of the address space which is shared between the primary address space and the secondary address space.

DAS permits programs operating at different levels of authority to be linked directly without invoking the supervisor. The instructions PROGRAM CALL and PROGRAM TRANSFER provide a protected mechanism for transferring control between programs operating at different levels, or the same level, of control. A PROGRAM CALL by a program in one address space to a program in another address space is called a program call with space switching (PC-ss) operation. A PROGRAM CALL to a program in the same address space with no space switching is called a program call to current primary (PC-cp) operation. Both the PC-cp and the PC-ss operations provide for a change to a higher level of privilege and authority. A return function is performed by a PROGRAM TRANSFER instruction which may be to current primary (PT-cp) or with a space switching operation (PT-ss).

To accomplish a transfer of control, DAS establishes several tables. A linkage table is established for use by the program call operation, with each linkage-table entry containing an entry-table address. An entry table is established at the entry-table address, each entry of which contains entry information for a program to be called. For each program call operation, DAS creates a PC number composed of a linkage index (LX) and an entry index (EX). The LX indexes into the linkage table to obtain an entry-table address, and the EX indexes into the entry table at that address to obtain entry information for the called program. The entry-table-entry data includes an address space number (ASN) which is used to identify the address space of the respective program.

DAS also establishes an ASN first table and an ASN second table which are used for translating the ASN value found in the entry-table entry. The ASN assigned to the address space is made up of an ASN-first-table index (AFX) and an ASN-second-table index (ASX). The AFX indexes into the ASN first table to a ASN-first-table entry which contains an ASN second table designation. If the ASN-first-table entry is valid, the ASX value indexes into the ASN second table. The thus located ASN-second-table entry (ASTE) includes a segment table origin (STO) which is used by a dynamic address translator (DAT) to determine the real addresses of the target address space.

The bits of a PSW-key mask (PKM) in control register 3 are used in the problem state to control which keys and entry points are authorized for the program. The PKM is modified by PROGRAM CALL and PROGRAM TRANSFER and is loaded by a LOAD ADDRESS SPACE PARAMETERS instruction. The PKM is used in the problem state to control the PSW-key values that can be set in the PSW by means of a semiprivileged instruction to control the PSW-key values that are valid for the MVCP, MVCS and MVCK instructions that specify a second access key, and to control the entry points which can be called by means of PROGRAM CALL.

In a PROGRAM CALL, the PSW-key mask is ANDed with an authorization key mask (AKM) in the entry-table entry. If the result is nonzero, the program is authorized to issue the PC instruction. The entry-table entry contains an entry key mask (EKM) that may contain additional keys to which the called program is authorized. The EKM is ORed into the PKM in control register 3 when the PC routine receives control. This can increase the authority provided by the PKM.

In a PROGRAM TRANSFER, the PKM in control register 3 is ANDed with a PSW-key mask that is specified as an operand, and the result replaces the PKM in control register 3. This can decrease the authority provided by the PKM.

In the MVCP, MVCS and MVCK instructions, access to the primary address space is authorized by the PSW key in the PC operation. In the case of the MVCP and MVCS instructions, an operand specifies an access key to be used to access the secondary space. In the problem state, an MVCP or MVCS operation is performed only if the PKM bit in control register 3 corresponding to the secondary-space access key of the operand is one. In the case of the MVCK instruction, an operand specifies an access key to be used to access the source data area. In the problem state, an MVCK operation is performed only if the PKM bit in control register 3 corresponding to the source-data-area access key of the operand is one.

ASN authorization is the process of testing whether the program associated with the current authorization index is permitted to establish a particular address space by use of an authorization index (AX). The ASN authorization is performed as part of a PT-ss operation, or a SET SECONDARY ASN with space switching (SSAR-ss) operation which sets the secondary address space to any desired address space. Each address space has associated with it an authority table (AT) which contains one entry for every AX in use. The AX entry in the AT indicates the authority of programs running under that AX to issue PT and SSAR instructions to the address space. ASN authorization is required for both supervisor state and problem programs. The AX to be checked against the AT is located in control register 4, and the authority-table origin (ATO) for the address space is located in the ASTE of the target address space. Each entry of the authority table consists of two bits, a P bit and an S bit. The program with an AX corresponding to that AX entry in the AT is permitted to establish the address space as its primary address space if the corresponding P bit is one and is permitted to establish the address space as its secondary address space if the corresponding S bit is one.

The use of the DAS facility has several limitations. The MVCP and MVCS instructions can only move data between the primary and secondary address spaces. DAS cannot move data between two arbitrary address spaces which are not primary or secondary address spaces. All of the programs executed in an address space use the authorization index associated with the address space. The use of the secondary mode by a program requires that the program be in the common area. Switching frequently between the primary mode and the secondary mode, in order to access data in both the primary address space and the secondary address space, severely decreases performance. A PC instruction performs only a hierarchical type linkage. It is not practical to use the PC instruction to give control from a supervisor state program to a problem state program because the PT instruction cannot be used to return. The PC instruction can only change the PSW-key mask by increasing its authority. The space switching PC instruction always gives the called program access to the calling program's address space. Finally, the PC instruction does not change the PSW key, so fetch-protected code cannot be called.

U.S. Pat. No. 4,037,214 to Birney et al for "Key Register Controlled Accessing System", assigned to the Assignee of the present invention, shows a horizontal addressing system in which three access key registers (AKRs) authorize the address space of a storage access as a function of an instruction address, a sink operand address and a source operand address, respectively.

U.S. Pat. No. 4,521,846 issued to the same assignee as the present invention and entitled "Mechanism for Accessing Multiple Virtual Spaces" shows another mechanism for controlling access to plural virtual address spaces in a cross-memory implementation where data can be accessed in a non-privileged state.

U.S. Pat. No. 3,787,813 to Cole et al for "Data Processing Devices Using Capability Registers", assigned to the Assignee of the present invention, shows the concept of data processing devices using capability register patent shows a data processing device with a central processing unit and a storage unit, the information in the storage unit being arranged in segments and the central processing unit having a plurality of capability registers each arranged to store descriptor information indicative of the base and limit addresses of an information segment. One of the capability registers is arranged to hold information defining the base and limit addresses of an information segment which contains a segment pointer table, particular to the program currently being executed by the central processing unit. A further one of the registers is arranged to hold information defining the base and limit addresses of an information segment which contains a master capability table having an entry for each information segment in the storage unit composed of information defining the base and limit addresses of a segment. The segment pointer table comprises a list of data words which are used as pointers to define different entries in the master segment table.

U.S. Pat. No. 4,366,536 to Kohn for "Modular Digital Computer System for Storing and Selecting Data Processing Procedures and Data", assigned to the Assignee of the present invention, shows a digital computer system for selecting and linking multiple, separately stored data processing procedures consisting of assembly level commands and for selecting a variable data area from a plurality of variable data areas. The system includes memories for storing the data processing procedures, the variable data areas and linking addresses; a program counter for accessing the memory containing the stored data processing procedures; registers for accessing the memories containing the data and the linking addresses; and a hardware unit which is adapted to execute the assembly level commands contained in selected data processing procedures in accordance with assembly level commands in the data processing procedure being executed and previously selected addresses.

U.S. Pat. No. 4,268,903 to Miki et al for "Stack Control System and Method for Data Processor", assigned to the Assignee of the present invention, discloses a stack control register group for controlling a stack area. A data stack pointer register holds the start address of the data stack area which is formed in the stack facility and controlled by the user program directly.

U.S. Pat. No. 4,454,580 entitled "Program Call Method and Call Instruction Execution Apparatus", assigned to the same assignee as the present invention includes a method of passing execution from a program in one logical address space to another program in a new logical address space. The calling program controls selective allocation of segments to the called program but the called program controls the lengths of the segments being allocated. In this way, recursive calls to the same program cannot affect the function or data of other programs or of the same program in a previous call. Also allocation of data segments can be postponed until execution resulting in more flexible execution of programs written without knowledge of the details of other co-executing programs.

U.S. Pat. No. 4,297,743 entitled "Call and Stack Mechanism for Procedures Executing in Different Rings" shows an architecture based on a hierarchy of rings where each ring represents a different level of privilege. Branches are allowed to rings having a lesser privilege and privilege levels are allowed to be different for read only status as opposed to read and write status. The patent shows a stack frame which has three areas: a work area for storing variables, a save area for saving the contents of register and a communications area for passing parameters between procedures. Prior to a procedure call, the user must specify those registers to be saved and the user must load into the communications area the parameters to be passed to the called procedure. The system provides for a history of calls in a sequence of stack frames so that a return can be accomplished. Finally, U.S. Pat. No. 4,044,334 entitled "Database Instruction Unload" shows a system for retrieving a database pointer for locating database records in one of a plurality of segments of addressable space.

IBM Technical Disclosure Bulletin, January 1982, Vol. 24, No. 8, pages 4401-4403 entitled "Method of Revoking a Capability Containing a Pointer-type Identifier without Accessing the Capability" deals with an Address Space No. (ASN) as a pointer-type identifier for the address space capability. This publication relates to the dual address space facility and the fact that an address space does not have to be entered to determine if the access is valid since that information may be determined using the ASN-second-table entry (ASTE) associated with address translation. In general, access to an object by means of the capability is permitted only when the unique codes in the capability and the object are equal. The capability can be revoked simply by changing the unique code in the object without the need to locate and access the capability.

SUMMARY OF THE INVENTION

The multiple address space (MAS) facility of the present invention provides 16 32-bit access registers numbered 0–15. In the access register mode, which results when the DAT is on and PSW bits 16 and 17 are 01 binary, an instruction B or R field that is used to specify the logical address of a storage operand designates not only a general register but also an access register. The designated general register is used in the ordinary way to form the logical addresses of the storage operand. The designated access register is used to specify the address space to which the logical address is relative by specifying a segment-table designation used by the DAT to translate the logical address for the address space. The access register itself does not contain the segment-table designation.

An access register may specify the primary or secondary segment-table designations stored in control registers 1 or 7, respectively, or it may specify a segment-table designation (STD) contained in an ASTE. In the latter case, the access register designates an entry in a table called an access list by means of an access-list-entry token (ALET), and the designated access-list entry in turn designates the ASTE.

The access list may be either a dispatchable-unit access list (DUAL) or a primary space access list (PSAL). Although an access list is associated with either a dispatchable unit or a primary address space, the valid entries in the list are intended to be associated with the different programs that are executed, in some order, to perform the work of the dispatchable unit. It is intended that each program be able to have a particular authority that permits the use of only those access-list entries that are associated with the program. The authority is represented by a 16-bit extended authorization index (EAX) in control register 8. Other elements used in the related authorization mechanism are a private bit in the access-list entry, an access-list entry authorization index (ALEAX) in the access-list entry, and the S bits of the authority table provided by the aforementioned DAS facility.

The private bit and the ALEAX field in the access list entry provide high performance authorization mechanisms to grant or prohibit a program's access to an address space represented by the ALE. The private bit can be 0, thus allowing all programs which execute with the access list to access the address space represented by the ALE. The ALE private bit can be 1 and the user's EAX in control register 8 can be equal to the ALEAX field. This allows programs with a particular EAX to access the address space represented by the ALE. Finally, the ALE private bit can be one and the user's control register 8 EAX can select an entry in the target space's authority table which has the S bit equal to one. This allows multiple programs running with different EAXs to access the address space represented by the ALE.

A linkage-stack facility permits programs operating at arbitrarily different levels of authority to be linked directly without the intervention of the control program. The degree of authority of each program in a sequence of calling and called programs may be arbitrarily different, thus allowing a nonhierarchical organization of programs to be established. Options, to include the EAX changing option, the PSW-key option, and those concerning the PSW-key mask and the secondary address space, provide means of associating different authorities with different programs or with the same called program. The authority of each program is prescribed in the entry tables, and these are managed by the control program. By setting up the entry tables so that the same program can be called by means of different PC numbers, the program can be assigned different authorities depending on which PC number is used to call it.

Stacking PROGRAM CALL and PROGRAM RETURN linkage operations provided by a linkage-stack facility can link programs residing in different address spaces and having different levels of authority. The execution state and the contents of the general registers and access registers are saved during the execution of a stacking PROGRAM CALL instruction and are partially restored during the execution of a PROGRAM RETURN instruction. A linkage stack provides an efficient means of saving and restoring both the execution state and the contents of registers during linkage operations.

It is a primary object of the present invention to provide an architecture for authorizing programs to fetch instructions from an address space, and to fetch or store operands in one or more other arbitrary address spaces.

It is another object of the present invention to provide an authorization mechanism wherein the authorization may be either hierarchical or nonhierarchical, as desired.

It is another object of the present invention to provide a nonhierarchical authorization mechanism in which the ability to access address spaces is granted to all programs in the program call sequence, or is limited to programs having only a specific level of authorization, or is permitted to several different authorization levels.

It is another object of the present invention to provide a test operation in which the authorization level of the address space may be tested to determine if an ALET references the caller's primary address space, the DUAL or the PSAL, and to determine if such references are authorized for a given EAX.

These and other objects and advantages of the invention will be apparent from the following description taken in conjunction with the accompanying drawings.

BRIEF DESCRIPTION OF THE DRAWINGS

FIG. 2 is a diagrammatic illustration of an access register translation of contents of an access register of FIG. 1;

FIG. 3 depicts the organization and contents of the control registers for use with the MAS facility of the present invention;

FIG. 5 depicts the format of an access-list-entry token for use with the MAS facility;

FIG. 6 depicts the format of an access-list entry for use with the MAS facility;

FIG. 7 depicts the format of a linkage-table entry;

FIG. 8 depicts the format of an entry-table entry for use with the MAS facility;

FIG. 9 is a diagrammatic illustration of a linkage stack for use with the MAS facility;

FIG. 10 depicts the format of an entry of the linkage stack of FIG. 9;

FIG. 18 is a diagrammatic illustration of the logic flow of an access register translation of FIG. 2;

DESCRIPTION OF THE PREFERRED EMBODIMENT

The multiple address space (MAS) facility of the present invention is an enhancement of the dual address space facility and of the access register system. The MAS facility is designed to run compatibly with, and in addition to, the DAS facility, and for the most part, to use the same tables and register arrangements as the DAS facility, with certain changes and enhancements. The access register translation (ART) system is an improvement which allows full use of the access register system by the user while providing isolation and protection of machine addressing functions from the user. The use of an ART lookaside buffer (ALB) enhances the performance of ART.

A service provider typically owns one or more address spaces containing data or programs, or both, which the service provider wants to make available to users. The service provider makes programs available to users by assigning them program call (PC) numbers. This assigning operation includes establishing links for transferring program control, specifying the authorization characteristics needed by the service callers, and assigning the authorization characteristics of the service provider's programs. The transfer of program control may be from one address space to another, or may remain in the same address space. In either case, it may change the authorization from one level to another to provide greater, lesser or different authorization. The service provider may run with an authorization level different than the caller's level, allowing the service provider routines to access data in address spaces which the caller cannot access. The user and service provider can access all spaces on the access list which have not been designated as private address spaces. Additionally, the service provider can have access to selected address spaces which the user cannot access, and the service provider can be denied access to selected address spaces which the user can access.

The execution of a program instruction may be conveniently divided into two operations. The first operation is the fetching of the instruction to be executed. The second operation is the addressing of operands for the fetching and storing of data on which the instruction operates during its execution. In MAS in the AR mode, the instruction is fetched from that address space established as its primary address space. The establishment of the primary address space may require a space switching operation.

Figures 1, 4:
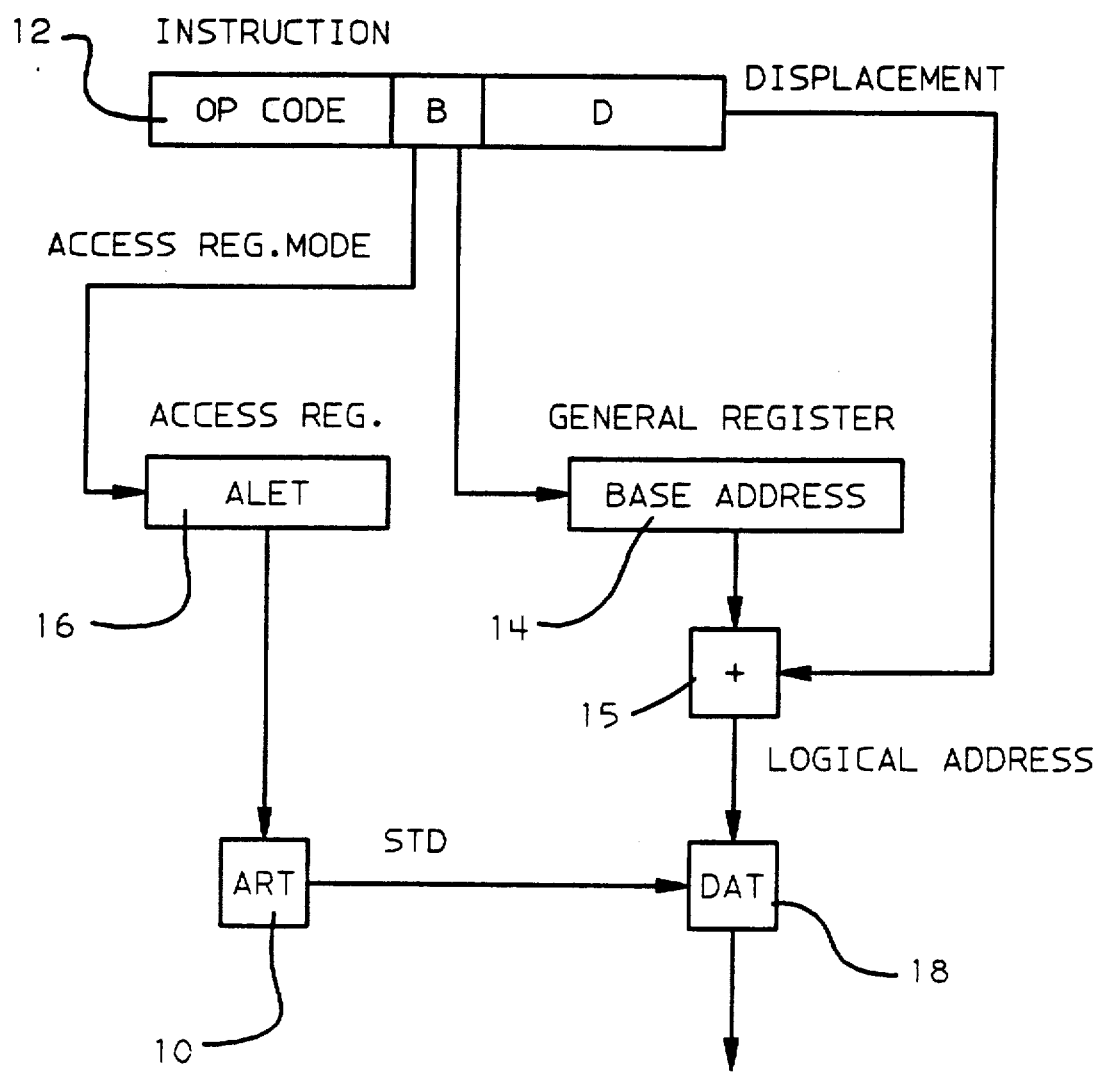
FIG. 1 is a diagrammatic illustration of the use of an access register in addressing operands.
FIG. 4 depicts the contents of the PSW for use with the MAS facility.

FIG. 1 shows the use of an access register according to the present invention in addressing operands. The process of using the contents of an access register to obtain a STD for use in a dynamic address translation is called an access-register-translation (ART) operation, which is generally designated at 10. An instruction 12 has an operation code, a B field which designates a general register 14 containing a base address, and a displacement D, which, when joined with the base address of general register 14 by an adder 15, forms a logical address of a storage operand. In the access-register mode, to be explained, the B field also designates an access register 16 which contains an ALET which, when translated at ART 10, provides the STD for the address space in which the data is stored. The STD from the ART 10 may be joined with the logical address from the adder 15, and, when translated together in the dynamic address translation (DAT) operation, designated generally at 18, provides the real address of the operand for use by the system. Instead of the B field and displacement D shown in FIG. 1, an R field may be used for designating a general register containing a logical address of a storage operand.

The use of an access register of the present invention may be further illustrated by the following move (MVC) instruction:

MVC 0(L,1),0(2)

The second operand of this instruction, having length L, is to be moved to the first-operand location. The logical address of the second operand is in general register 2, and the logical address of the first-operand location is in general register 1. The address space containing the second operand is specified by the ALET in access register 2, and the address space of the first-operand is specified by the ALET in access register 1. These two address spaces may be different address spaces, and each may be different from the current instruction address space.

FIG. 2 provides an overview showing the translation of an ALET to a real address. Shown at 20 is an array of general registers numbered 0 through 15. An array 22 of access registers, also numbered 0 through 15, are arranged such that each access register is paired with a respective one of the general registers of array 20, as previously described in connection with FIG. 1. An access-list entry number (ALEN) in the ALET selects an entry in one of the access lists 24 or 25. Access list 24 is the DUAL, and access list 25 is the PSAL. In the example of FIG. 2, the ALEN of access register 2 points to entry 3 of the PSAL 25. The origin of the DUAL is specified by a dispatchable-unit-access-list designation (DUALD) 26 which is found by decoding an entry in control register 2, as will be explained. The origin of the PSAL is specified by a primary-space-access-list designation (PSALD) 27 which is found by decoding an entry in control register 5, as will be explained. The access-list designation used in the ART is known as the effective access-list designation (ALD).

Each entry of the access list includes an ASTE address which points to an ASN-second-table entry (ASTE) 98 which may or may not be in an ASN second table (AST) 30. Each ASTE is similar to that used in the DAS facility, and includes an STD value to determine the real address by the DAT 18, as discussed in connection with FIG. 1.

There are two access lists available to a program at the same time. A bit in the ALET determines whether the ALEN of the ALET is pointed to an entry in the DUAL 24 or the PSAL 25. Each entry in the access lists 24 and 25 are available for use by programs. The DUAL 24 is intended to be permanently associated with the dispatchable unit 'task' or 'process' on behalf of the program or programs executed to perform the work of the dispatchable unit. There is a unique DUAL 24 for every dispatchable unit in the system. The DUAL 24 for a dispatchable unit does not change even though the work of the dispatchable unit may be performed through the execution of programs in many different address spaces. The PSAL 25 is associated with a primary address space. All programs which are executed in a primary address space share the PSAL 25 of the address space. This allows programs being executed within a primary space to share access to a common set of address spaces. The PSAL 25 changes when the primary address space changes such as on a space switching PC operation. A user, if he has a valid ALET, may access an access list entry on either the DUAL 24 or the PSAL 25, and this entry specifies the desired address space.

The mode of the CPU is designated by bits in the PSW, as will be explained. When instructions are in the access-register mode, an ALET of 0(X'00000000') refers to the primary address space and an ALET of 1(X'00000001') refers to the secondary address space. When the CPU is in the home mode, the home address space is the source of instruction to be executed and of data. The home address space is defined as that address space having the supervisor control information for the program being executed. By convention, the operating system assigns an ALET of 2(X'00000002') for each home space for the purpose of data access, and the STD for the home space is obtained via an ART for such access. As shown at 28, if the ALET is equal to 0, the STD is obtained from control register 1, and if the ALET is equal to 1, the STD is obtained from control register 7. Since the STD values for the primary and the secondary address spaces are thus kept in control registers 1 and 7, respectively (see FIG. 3) access list entries 0 and 1 are not used. As implemented, entries 0, 1 and 2 in the PSAL 25 are unused.

An ART lookaside buffer (ALB) 199 receives and saves inputs from the AR 22, the AL 25, and the AST 30 to hold the STD resulting from ART. When the same ALET is accessed again, ALB 199 provides the correct output directly to DAT 18 so that ART does not have to be repeated.

FIGS. 3 and 4 show the control registers and the PSW, respectively, for providing information for the control of a program and the state of the CPU during instruction execution.

FIG. 3 shows the contents of the control registers 0 through 15 for the MAS facility of the present invention. All of the contents of the control registers of FIG. 3 will not be discussed, as the majority of them have the identical functions of the control registers of the aforementioned DAS facility and are thus known. Thus, only those changes necessary to provide the MAS facility will be discussed. A one in bit 15 of control register zero indicates that the MAS facility is active. The MAS facility includes new formats for the entry-table entry, the ASN-second-table entry, the availability of a linkage stack, and the ability to enter the access-register mode. Bits 1–25 of control register 2 designate the dispatchable-unit-control-table origin (DUCTO) used by the MAS facility to locate the DUALD, as will be discussed. Bits 1–25 of control register 5 designate the primary ASTE origin (PASTEO). As will be discussed, the entry in control register 5 points to the ASTE entry for finding the PSAL origin, and other information, in the ASTE for the primary address space.

Bits 0–15 of control register 8 contain an extended authorization index (EAX) for use by the MAS facility of the present invention. As will be discussed, the EAX may be modified as specified by bit entries in the entry-table entry under the control of the service provider such that authorization to access address spaces by a program may be changed.

Control register 13 contains a home segment-table designation (HSTD) wherein bits 1–19 contain the home segment-table origin (HSTO), and bits 25–31 contain the home segment-table length (HSTL). Bits 1–28 of control register 15 contain the address of a linkage-stack entry as defined in the last linkage-stack operation, to be discussed.

FIG. 4 shows the format of the program status word (PSW). Bit 5 of the PSW is a DAT mode bit (T) which defines if the DAT 18 of FIGS. 1 and 2 is active. When the DAT is active, the combination of bits 16 and 17 define if the CPU is in the primary mode (00), the secondary mode (10), the access register mode (01), or the home mode (11). Bit 32 of the PSW is an addressing mode bit which defines the format of the instruction address in bits 33 through 63 of the PSW. The function and format of the remainder of the fields in the PSW are well understood and defined for IBM System/370 Operations.

FIGS. 5 and 6 show the format of the ALET and the access-list entry for defining the relationship of an access register and an address space.

FIG. 5 shows the format of the ALET discussed in connection with FIG. 2. In the ALET, bit 7 is a primary-list bit which, when 1, indicates that the ALEN refers to a PSAL. When the primary-list bit 7 is 0, the ALEN refers to the DUAL. Bits 16–31 contain the ALEN referred to in FIG. 2. When the ALEN is multiplied by 16, the product is equal to the number of bytes from the beginning of the effective access-list to the designated access-list entry. During the ART, an exception is recognized if the ALEN designates an entry that is outside of the effective access-list or if the left most 7 bits of the ALET are not all zeroes. The access-list entry is outside of the effective access list if the ALEN points to an address past the end of the access-list as determined by the access-list length (ALL) of the effective ALD. See FIG. 14 for the ALL. The described format of the ALET does not apply when the ALET is 00000000 or 00000001 hex as shown at 28 of FIG. 2.

An ALET can exist in an access register, in a general register or in storage, and it is not protected from manipulation by a user's problem program. Through the use of instructions, any program can transfer the value of an ALET back and forth between access registers, general registers and storage. A called program can save the contents of the access registers in any storage area available to it, load and use the access registers for its own purposes, and then restore the original contents of the access registers before returning to its caller. Bits 8–15 of the ALET contain an access-list-entry sequence number (ALESN). Since the ALET is not protected from the problem program, and a user may inadvertently change its contents to any value, the ALESN is included in the ALET as a reliability mechanism that is checked during a ART.

FIG. 6 depicts the format of an access-list entry (ALE). Bit 0 of the ALE is an invalid bit which indicates when the ALE is not valid. Bit 7 is a private bit which, when 0, specifies that any program is authorized to use this access-list entry in an ART operation. When bit 7 is 1, an access-list extended authorization index (ALEAX) value in bits 16–31 of the ALE is used to determine if a program is authorized to use this access-list entry. The ALE includes an ALESN value in bits 8–15, which is compared to the ALESN value of the designating ALET, as discussed in connection with FIG. 5, to make a validity check. Bits 65–89 of the ALE contains the corresponding ASTE address of the associated address space. An ASTE sequence number (ASTESN) is located in bits 96–126 of the ALE for use as a validity check in connection with the ASTE, to be discussed.

It is intended that entries on the access-lists 24 and 25 be provided by the control program such that they may be protected from direct manipulation by any problem program. This protection may be obtained by means of key-controlled protection or by placing the access-lists in real storage not accessible by any problem program by means of the DAT. As determined by bit 0 in the entry, an ALE is either valid or invalid. A valid ALE specifies an address space that can be used by a suitably authorized program to access that address space. An invalid ALE is available for allocation, or reallocation, as a valid entry. The control program provides services that allocate valid ALEs and that invalidate previously allocated ALEs.

Allocation of an ALE consists of the following steps. A problem program passes the identification of an address space to the control program, and passes an indication consisting of the primary list P bit (bit 7) specifying either the DUAL 24 or the PSAL 25. The control program then checks the authority of the problem program to access the address space, as will be explained. If the program is authorized, the control program selects an invalid entry in the specified access list, changes it to a valid entry, includes the ASTE address and ASTESN thereby specifying the subject address space, and returns to the problem program, the value of an ALET which designates the now allocated ALE. The problem program can then place the new ALET in an access register in order to access the address space. Later, through the use of the invalidation service of the control program, the ALE that was allocated may be made invalid.

In this way, a particular ALE may be allocated, then invalidated, and then reallocated, this time specifying a different address space then was specified in the original allocation. To guard against erroneous use of an ALET that designates a conceptually wrong address space, the ALESN is stored in both the ALET and the ALE. When the control program allocates an ALE, it places the same ALESN in both the ALE and the designated ALET that it returns to the problem program. When the control program reallocates an ALE, it changes the value of the ALESN in the reallocated ALE such that the value of the ALESN of previously designated ALETs no longer matches the ALESN in the new ALE.

Although the ASTESN portion of the ALE will be discussed further in connection with the ASTE and the associated figures, it is important to note here that comparison of the ASTESN value in the ALE with the value in the ASTE is the mechanism by which the ALE authority to designate the ASTE is confirmed. Thus, an ASTE can be reassigned and a different ASTESN assigned to control its use without having to back track to all ALE entries which have referenced the ASTE. Through use of the ASTESN, the control program does not have to retain every program or dispatchable unit which was able to use the ASTE. Thus, the authority can be changed by changing the ASTESN and exceptions or interruptions generated when an attempt is made to use the ASTE without the proper ASTESN.

FIGS. 7, 8 and 10 depict the formats of entries in the linkage table, the entry table and the linkage stack, respectively. These tables are used by the MAS facility to establish linkage for transferring control between programs in either the same or different address spaces.

As previously described, a PC number identifies the particular PC routine that the system is to invoke and is constructed by a service provider. Each service provider that provides PC routines owns one or more entry tables for defining the service provider's routines. The entry tables are connected to linkage tables of those address spaces that require access to the PC routines. Each entry in an entry table defines one PC routine, including its entry point, operating characteristics, and if the PC instruction is a stacking PC. FIG. 7 depicts the format of a linkage table entry, wherein each entry includes an invalid bit at bit 0, an entry table origin (ETO), and an entry table length (ETL), which together define an entry-table designation.

FIG. 8 depicts the format of the entry of the entry table pointed to by the linkage-table entry of FIG. 7. Bits 0–15 of the entry-table entry contain an authorization key mask (AKM) which is used to verify whether the program issuing the PC instruction, when in the problem state, is authorized to call this entry point. Bits 16–31 contain an entry address-space number (EASN) which indicates whether a PC-ss or a PC-cp is to occur. When the EASN is all zeroes, a PC-cp is specified. When the EASN is not all zeroes, a PC-ss is specified, and the EASN identifies the address-space number (ASN) which replaces the primary ASN (PASN). Bit 32 is an addressing mode bit that replaces the addressing mode bit in the PSW as part of the PC operation. The entry instruction address is the instruction address that replaces the instruction address in the PSW as part of the PC operation. Bit 63 is an entry problem state bit which replaces the problem state bit, bit 15 of the current PSW, as part of the PC operation. Bits 64–95 are an entry parameter which is placed in general register 4 as part of the PC operation. Bits 96-111 are an entry key mask (EKM) which may be ORed into or replace the contents of control register 3, dependent upon the value of the M bit, as will be explained. Bit 128 is a PC-type bit (T) which, when 1, specifies that the program call instruction is to perform a stacking operation. Bit 131 is a PSW-key control (K) which, when 1, specifies that the entry key (EK) of bits 136-139 is to replace the PSW key in the PSW as part of the stacking PC operation. When the K bit is 0, the PSW key remains unchanged. Bit 132 is a PSW-key-mask control (M) which, when 1, specifies that the EKM is to replace the PSW-key mask in control register 3 as part of the stacking PC operation. When this bit is 0, the EKM is ORed into the PSW-key-mask in control register 3 as part of the stacking PC operation. Bit 133 is an extended-authorization-index control (E) which, when 1, specifies that the entry EAX of bits 144-159 is to replace the current EAX in control register 8 as part of the stacking PC operation. When the E bit is 0, the current EAX in control register 8 remains unchanged. Bit 134 is an address-space-control control (C) which, when 1, specifies that bit 17 of the current PSW is to be set to 1 as part of the stacking PC operation. When this bit is 0, bit 17 of the current PSW is set to 0. Because the CPU must be in either the primary-space mode or the access-register mode when a stacking PC instruction is issued, the result of this C bit is that the CPU is placed in the access-register mode if bit 134 is 1 or the primary-space mode if bit 134 is 0. Bit 135 is a secondary-ASN control (S) which, when 1, specifies that the EASN bits 16-31 are to become the new secondary ASN, and a new secondary segment-table designation (SSTD) is to be set equal to the new primary segment-table designation (PSTD), as part of the stacking PC-ss operation. When this bit is 0, the new secondary address-space number (SASN) and SSTD are set equal to the old primary address-space number (PASN) and PSTD, respectively, of the calling program. When the EASN is not all zeroes, the ASTE address of bits 161-185, with six zeroes appended on the right, forms the real ASTE address that results from applying the ASN translation of the EASN. It will thus be seen that the EASN and ASTE address entries in the entry-table entry point to an entry in the AST 30 which contain the STD, as shown in connection with FIG. 2. It is unpredictable whether an ASN translation of the EASN is performed to obtain an ASTE address, or whether the ASTE address of bits 161-185 is used to locate its designated ASTE. The CPU may do the latter to achieve improved performance.

FIG. 9 shows a linkage stack 35 which may be formed by the control program for each dispatchable unit. The linkage stack is used to save the execution state and the contents of the general registers and access registers during a stacking operation. The linkage stack is also used to restore a portion of the execution state and the general-register and access-register contents during a return operation. A linkage stack resides in virtual storage, with the linkage stack for a dispatchable unit in the home address space for that dispatchable unit. As discussed in connection with the control registers of FIG. 3, the home address space is designated by the HSTD in control register 13.

The linkage stack is intended to be protected from problem-state programs so that these programs cannot examine or modify the information saved in the linkage stack except by means of specific extract and modify instructions. The linkage stack 35 may consist of a number of linkage stack sections 36, 37 and 38 which are chained together by forward pointers and backward pointers.

There are three types of entries in the linkage stack: header entries 40 having a backward pointer, trailer entries 42 having a forward pointer, and state entries 43 (see linkage stack section 36). A header entry and a trailer entry are at the beginning and end, respectively, of a linkage-stack section and are used to chain linkage-stack sections together. Header entries and trailer entries are formed by the control program, and a state entry is added to contain the execution state and register contents that are saved in the stacking operation. The linkage-stack-entry address in control register 15 points to either the current state entry 44 or, if the last state entry in the section has been unstacked, to the header entry for the current section. FIG. 10 depicts the contents of a linkage-stack state entry which, for a stacking PC instruction, contains the contents of the general registers, the contents of the access registers, the PSW key mask, the secondary address space number, the EAX from control register 8, the primary address space number, and the contents of the PSW, all at the beginning of the stacking instruction, and the PC number used. In the case of a BRANCH AND STACK instruction (to be explained), the addressing mode bit and the branch address would be saved rather than the PC number.

Each type of linkage-stack entry has a length that is a multiple of eight bytes. A header entry and trailer entry each has a length of 16 bytes. A state entry has a length of 168 bytes (as shown by the numbers in FIG. 10). Each type of entry has an eight-byte entry description at its end (shown at 46 of FIG. 10 for a linkage-stack state entry).

Bit 0 of the entry descriptor is an unstack-suppression bit (U). When bit U is one in the entry descriptor of a header entry or a state entry, a stack-operation exception is recognized during the unstacking process in PROGRAM RETURN. Bit U is set to zero in the entry descriptor of a state entry when the entry is formed during the stacking process.

Bits 1-7 of the entry descriptor are an entry type (ET) code that specifies the type of linkage stack entry containing the entry descriptor. The codes are:

| | |
|---|---|
| 0000001 | Header entry |
| 0000010 | Trailer entry |
| 0000100 | Branch state entry |
| 0000101 | Program-call state entry |

Bits 8-15 of the entry descriptor are a section identification (SI) provided by the control program. In the entry formed by a stacking process, the process sets the SI equal to the SI of the preceding linkage-stack entry. Bits 16-31 of the descriptor form the remaining free space (RFS) field which specifies the number of bytes between the end of this entry and the beginning of the trailer entry in the same linkage-stack section. Bits 32-47 of the entry descriptor form the next-entry size (NES) field which specifies the size, in bytes, of the next linkage-stack entry, other than a trailer entry, in the same linkage stack section.

When a new state entry is to be formed in the linkage stack during the stacking process, the new entry is placed immediately after the entry descriptor of the current linkage-stack entry, provided that there is enough remaining free space in the current linkage-stack section to contain the new entry. If there is not enough remaining free space in the current section, and if the trailer entry in the current section indicates that another section follows the current section, the new entry is placed immediately after the entry descriptor of the header entry of that following section, provided that there is enough remaining free space in that section. If the trailer entry indicates that there is not a following section, an exception is recognized, and a program interruption occurs. The control program then allocates another section, chains it to the current section, and causes the stacking operation to be reexecuted. If there is a following section but there is not enough free space in it, an exception is recognized.

When the stacking operation is successful in forming a new state entry 44, it updates the linkage-stack-entry address in control register 15 so that the address designates the leftmost byte of the entry descriptor of the new entry, which thus becomes the new current linkage-stack entry. When a state entry is created during the stacking process, zeros are placed in the NES field in the created entry, and the length of the created state entry is placed in the NES field of the preceding entry. During a return operation, the contents of the general registers, access registers, and various contents of the control registers are restored from the linkage-stack-state entry 44, and the linkage-stack-entry address in control register 15 is changed to point to the previous linkage-stack entry. When the state entry is logically deleted during the unstacking process of a return operation, zeros are placed in the NES field in the preceding entry. It will thus be understood that the use of the linkage stack allows the operating environment and authorization level of the calling program to be reinstated when program control is returned from the called program by a return instruction.

An ASN number is assigned by the control program for each address space which contains programs. The ASN may be translated during a PC-ss operation as described in connection with the DAS facility. However, since the ASTE address may be found in the ETE (see FIG. 8), access to the ASTE may be made directly in those cases through the ETE in a PC-ss operation without ASN translation. The control program associates an STD, AT and a linkage table with each ASN by placing pointers in the ASTE associated with the address space. Data in these address spaces may be accessed by having the control program construct an access-list entry pointing to the ASTE. A capability of the MAS facility provides for the creation of address spaces which contain only data, no programs. These address spaces do not contain ASNs. In the case of data only spaces, only the ASTE, STD, AT and ALE are used.

Figure 11:
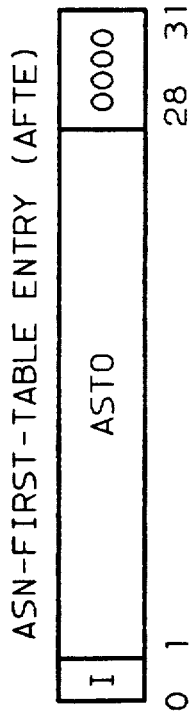
FIG. 11 depicts the format of an ASN-first-table entry.
Figure 12:
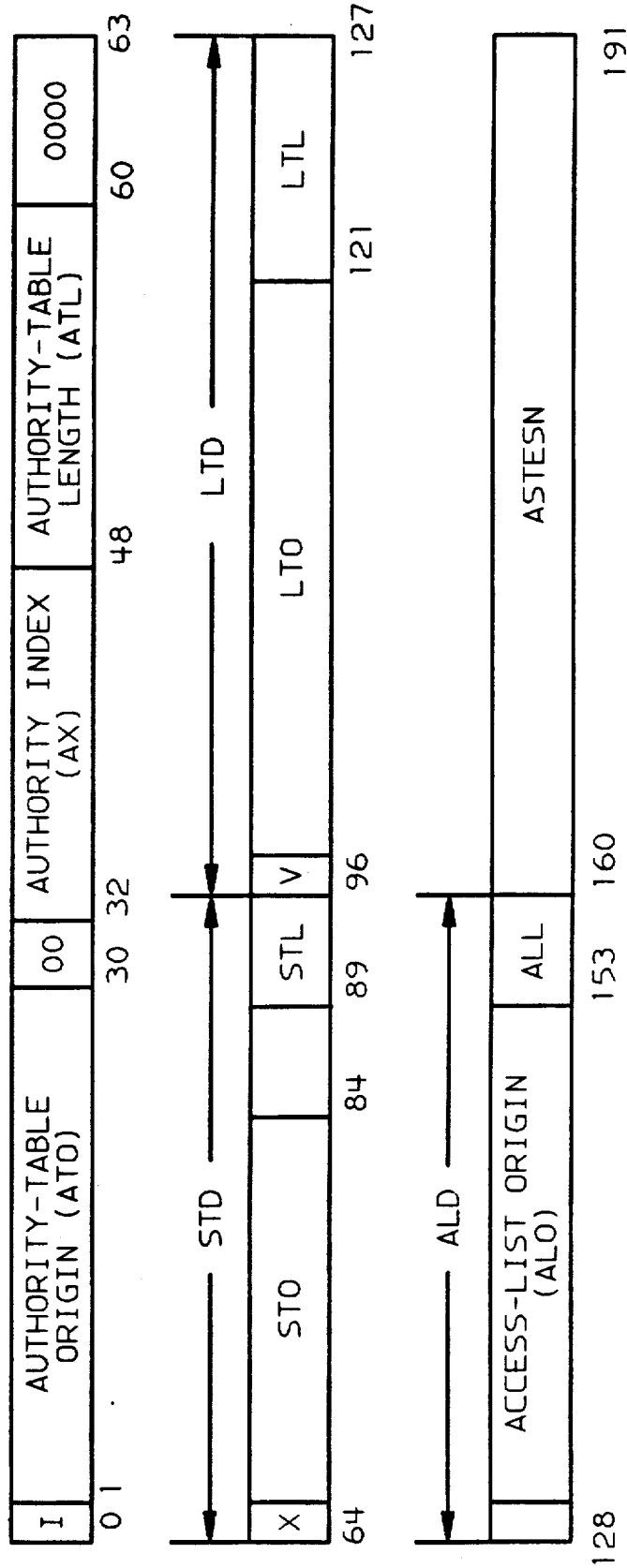
FIG. 12 depicts the format of an ASN-second-table entry for use with the MAS facility.

FIGS. 11 and 12 show the format of entries in the ASN first table and ASN second table, respectively, and are very similar to those of the aforementioned DAS facility. Each entry in the ASN tables of FIGS. 11 and 12 represents an address space and is established by the control program to provide linkage and authorize addressability to the associated address space.

FIG. 12 shows the format of an ASTE. Bit 0 of the ASTE is an invalid bit for indicating the validity of the ASTE. The authority table origin (ATO) and the authority table length (ATL) indicate the authority table designation (ATD) of the associated authority table. Bits 96–127 contain the associated linkage-table designation (LTD) and bits 128–160 contain the associated access-list designation. Bits 160–191 contain an ASTE sequence number (ASTESN) for the address space. Since the ASTE may be reallocated as address spaces are created and deleted by the control program, each newly created ASTE has a new, unique ASTESN assigned to it. When an ART operation takes place, the ASTESN in the access-list is compared with the ASTESN in the ASTE as a validity check.

Figures 13, 14:
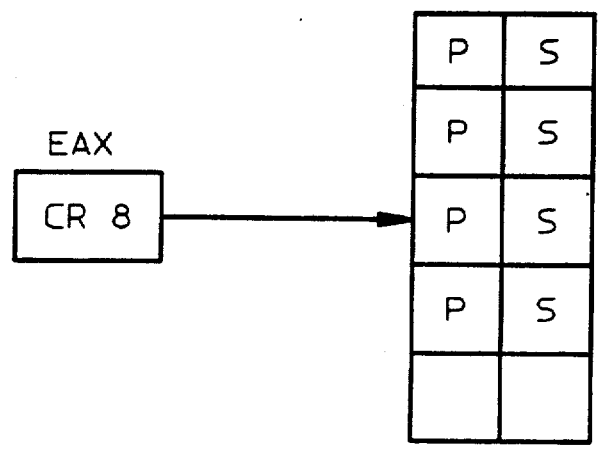
FIG. 13 depicts the format of an entry of an authority table for use with the MAS facility.
FIG. 14 depicts the format of a dispatchable-unit-control table for use with the MAS facility.

FIG. 13 shows an authority table which is associated with each ASTE. As with the DAS facility, each authority table entry has a P bit and a S bit. The entries in the authority table are indexed such that there is one entry in the authority table for each of the values of EAX in use to access the associated address space. As will be discussed, the entry of the authority table which corresponds to the value of EAX in control register 8 may be used to determine if a program is authorized to access the address space associated with the ASTE.

FIG. 14 shows the format of the dispatchable unit control table (DUCT) whose address is located in control register 2, as previously discussed. The dispatchable-unit-access-list designation is stored in bytes 16–19 of the DUCT. The other bytes of the DUCT are not used in the MAS facility, and will not be discussed further.

One instruction has been enhanced and two instructions have been added to provide for linkage in the MAS facility. The one instruction which has been enhanced is PROGRAM CALL. If the T bit, bit 128, of the ETE (see FIG. 8) is one, a stacking PROGRAM CALL operation is performed responsive to a PROGRAM CALL instruction. A PROGRAM CALL (stacking or non-stacking) for problem state callers is authorized to enter at a point in an entry table by the authorization key mask in the entry-table entry. A stacking PC with space switching, among other operations, may place a new EAX associated with the new program in control registers 8. The stacking PC saves the contents of general registers 0–15, the contents of access registers 0–15, the complete PSW with an updated instruction address (the return address), the primary and secondary ASNs, the PKM, the EAX, an indication that the entry was formed by PROGRAM CALL, the PC number used, and a two-word modifiable area. The MAS facility includes instructions for extracting the information in the last state entry in the linkage stack and for modifying the contents of the modifiable area in the entry. The purpose of the modifiable area is to allow a program to "footprint" its progress so that appropriate recovery actions can be taken if a failure of the program occurs.

The two new instructions which have been added to the MAS facility to improve linkage are:

BRANCH AND STACK PROGRAM RETURN

The BRANCH AND STACK instruction changes the instruction address in the PSW and forms a state entry, called a branch state entry, in the linkage stack of FIG. 9. The branch state entry is the same as a program call state entry of FIG. 10 except that it indicates that it was formed by BRANCH AND STACK and contains the branch address instead of the PC number. The BRANCH AND STACK instruction can be used either in a calling program or at (or near) the entry point of a called program. The BRANCH AND STACK instruction at an entry point allows the linkage stack to be used without changing old calling programs.

The PROGRAM RETURN instruction is used to return from a program given control by means of either a stacking PROGRAM CALL or a BRANCH AND STACK instruction. PROGRAM RETURN logically deletes the last linkage-stack state entry, which may be either a program call state entry or a branch state entry. If the last state entry is a program call state entry, PROGRAM RETURN restores all of the state information that was saved in the entry and the contents of general register 2-14 and the access registers 2-14. General and access registers 0, 1 and 15 are unchanged by PROGRAM RETURN. If the last state entry is a branch state entry, PROGRAM RETURN restores only the complete PSW and the contents of general registers 2-14 and access registers 2-14. However, PROGRAM RETURN always leaves the PER mask bit in the PSW (bit R in FIG. 4) unchanged in order not to counteract a PER (program-event recording) enablement or disablement that may have occurred while the called program was being executed. The combination of a stacking PROGRAM CALL and a PROGRAM RETURN permits nonhierarchical program linkage, that is, linkage from a program with some amount of authority to a program with less, more, or completely different authority.

Figure 15:
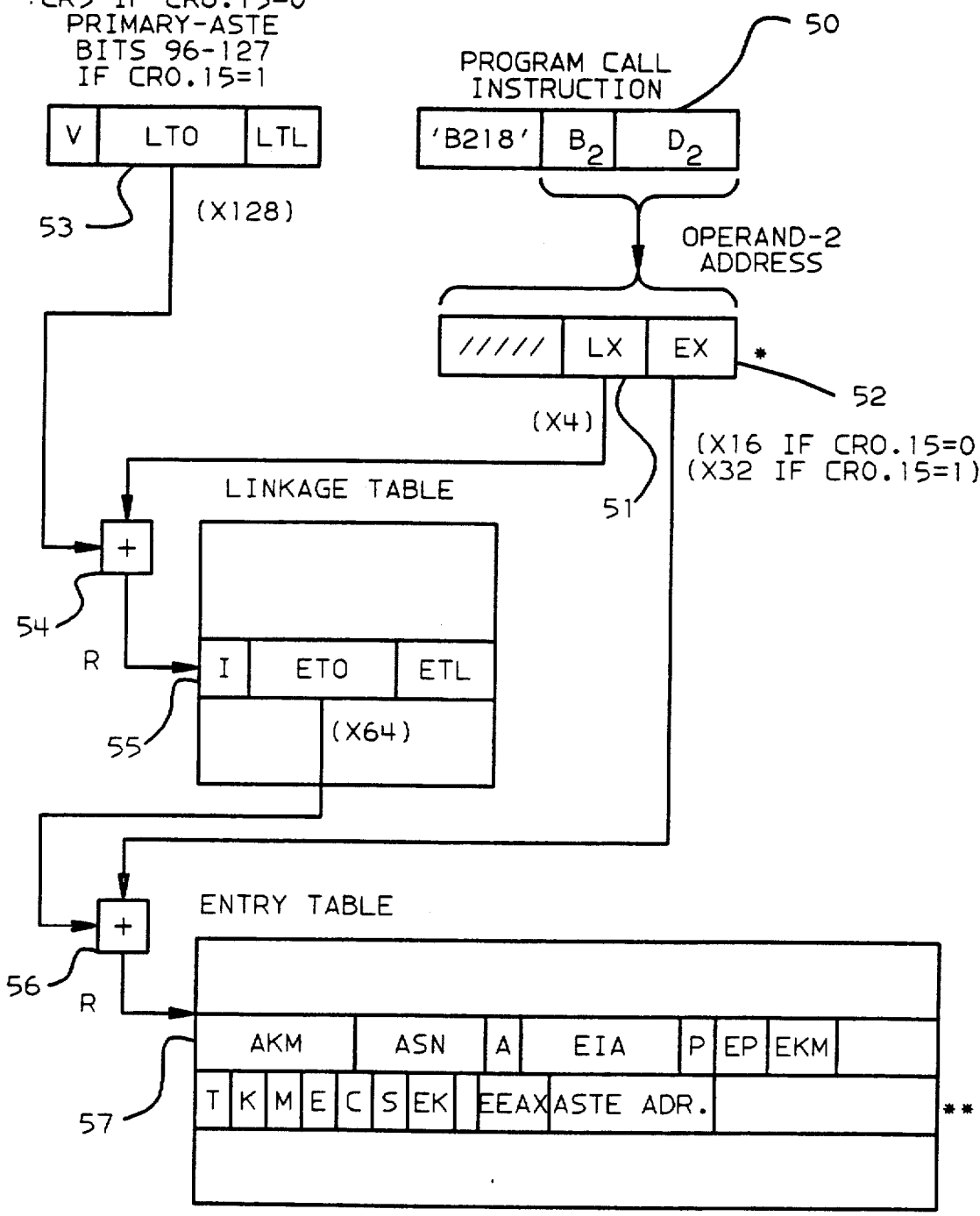
FIG. 15 is a diagrammatic illustration of the logic-flow of a PC number translation of a PROGRAM CALL operation.
Figure 16:
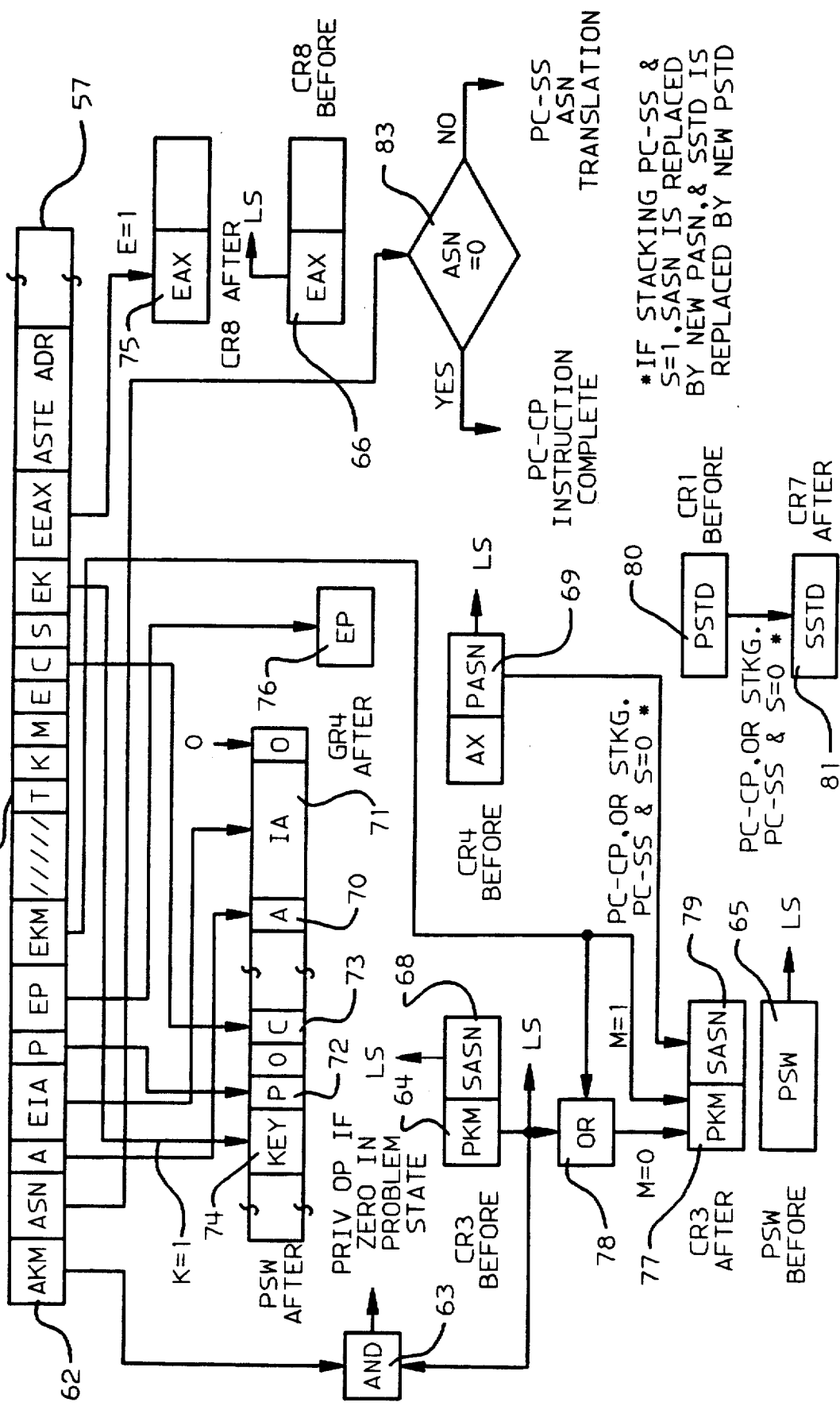
FIG. 16 is a diagrammatic illustration of the logic flow of a stacking operation of a stacking PROGRAM CALL instruction.
Figure 17:
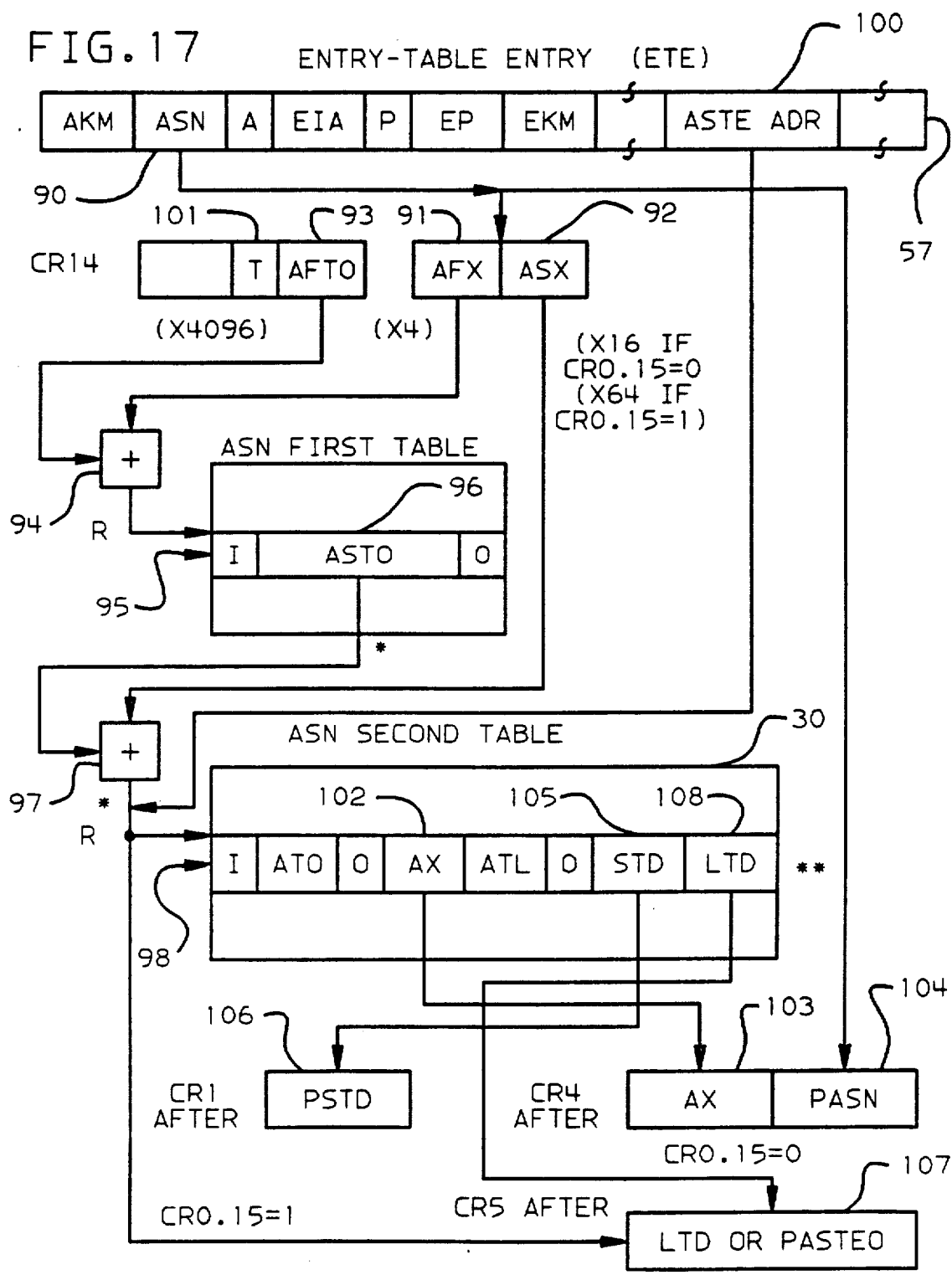
FIG. 17 is a diagrammatic illustration of the logic flow of an ASN translation of a PROGRAM CALL operation.

FIGS. 15, 16 and 17 present the logic flow of the steps necessary to execute a stacking PC operation. It will be noted that the logic flow of FIGS. 15, 16 and 17 can also be used to execute a DAS PROGRAM CALL instruction. The textual information in the figures describe how various values may be mathematically manipulated to form addresses. Referring back to FIG. 3, if bit 15 of control register 0 (CR0.15) is 0, ETE is 16 bytes, and only a DAS PC operation can be performed. If CR0.15 is one, ETE is 32 bytes, and ETE bit 128 controls whether a DAS PC or a stacking PC is performed.

FIG. 15 is a logic flow diagram of the PC number translation operation of a PROGRAM CALL. If CR0.15 = 1, the ASTE pointed at by the PASTEO entry in control register 5 (see FIG. 3) is fetched. This primary-ASTE includes an LTD at bits 96–127 (see FIG. 12). If CR0.15 = 0, the LTD is located in control register 5 as in a normal DAS operation. The PROGRAM CALL instruction 50 includes an LX 51 and an EX 52, the same as that discussed in connection with the DAS facility. The LX 51 is joined with the linkage-table origin (LTO) 53 by an adder operation 53 to give the real address of a linkage table entry 55. The entry-table origin (ETO) of the linkage table entry 55 is joined with the EX 52 by an adder operation 56 to give the real address of an entry-table entry (ETE) 57 in the entry table.

FIG. 16 is a logic flow of the steps which are executed in addition to the those shown in FIG. 15 for performing a stacking PROGRAM CALL to current primary (PC-cp) and a stacking PROGRAM CALL with space switching (PC-ss). As previously discussed, if the T bit 60 (bit 128 of the ETE 57) is equal to 1, a stacking operation is to be conducted. First, the value of the AKM 62 is ANDed at 63 with the PKM in control register 3 as it existed before the execution of the PROGRAM CALL instruction, as shown at 64. The AKM ANDing operation only occurs if the PC issuer is in the problem state. If the result of the ANDing operation at 63 gives all zeroes, the PROGRAM CALL instruction is not authorized to enter at this point, and the PROGRAM CALL operation is terminated. If any one of the bits match in the ANDing operation of 63, the program is authorized to make the PROGRAM CALL at this entry, and the operation continues. If the PROGRAM CALL is authorized, the PSW at 65, the EAX at 66, the PKM 64, the SASN 68, and the PASN 69 as they all existed before the PROGRAM CALL are placed on the linkage stack. Also placed on the linkage stack, but not shown, are the contents of the general registers, the contents of the access registers, and the PC number (see FIG. 10). The addressing mode bit A and the entry instruction address are placed in the PSW at 70 and 71. The P bit and C bit of the ETE 57 are placed in the PSW at 72 and 73. If the K bit is equal to 1, the entry key (EK) of the ETE 57 is placed in the key of the PSW at 74. If the E bit is equal to 1, the entry EAX (EEAX) is placed in control register 8 at 75. The entry parameter (EP) is placed in general register 4 at 76. If the M bit of the ETE 57 is equal to 1, the entry key mask (EKM) replaces the PKM at 77 in the control register 3. If, however, the M bit is equal to 0, the EKM is ORed into the PKM of control register 3 by the ORing operation 78. If a PC-cp operation is being executed or a stacking PC-ss is being conducted and the S bit is equal to 0, the PASN at 69 replaces the SASN at 79 in control register 3, and the PSTD at 80 in control register 1 replaces the SSTD 81 in control register 7. If a stacking PC-ss is being conducted and the S bit is equal to 1, the SASN in control register 3 is replaced by the new PASN and the SSTD in control register 7 is replaced by the new PSTD. After these operations, the ASN of ETE 56 is tested at 83. If the ASN is equal to 0, a PC-cp operation is being conducted and is complete. If, however, the ASN is not equal to 0, a PC-ss operation is being conducted, and the ASTE is obtained for the destination space.

The PROGRAM CALL may change the PSW key 74 with the EK (K bit = 1) to give access to fetch protected code of the next instruction.

By changing the EAX in control register 8 (see 75), each program executed to perform the work of the dispatchable unit can be differently authorized to use the ALEs in the DUAL and the PSAL. The EAX 75 in control register 8 can be set equal to the EEAX by a stacking PROGRAM CALL (E bit = 1). The original EAX will then be restored from the linkage stack by a PROGRAM RETURN. Thus, each program can be executed with an EAX that is specified in the ETE that is used to call the program. Alternately, the EAX can remain unchanged during a calling linkage (E bit = 0), allowing the called program to have the same authority as its caller.

By setting the PKM 77 in control register 3 equal to the EKM by a PROGRAM CALL (M bit = 1), the called program has a PKM that is independent of the PKM of the calling program. This allows the called program to have less authority, in terms of the PSW-key values it can set, than the calling program. Alternately, the new PKM 77 may be set equal to the OR of the old PKM 64 and the EKM (M bit = 0), if desired (see 78).

Setting the new SASN and new SSTD equal to the new PASN and new PSTD, respectively (S = 1), prevents the called program from automatically having access, through the use of ALET 00000001 hex, to the caller's primary address space (access capability still may be obtainable by means of either an ALE or the DAS SET SECONDARY ASN instruction). This is another way in which the authority of the called program can be less than that of the caller. Alternately, the new SASN at 79 and the new SSTD at 81 may be set equal to the old PASN at 69 and the old PSTD at 80, respectively (S bit=0).

FIG. 17 is a logic flow of the steps of an ASN translation. As in the DAS facility, each address space containing programs is assigned an ASN, whose value is stored at 90 in the corresponding ETE 57. Also as in DAS, the ASN at 90 consists of two numbers, an AFX 91 and an ASX 92. Control register 14 includes an ASN-first-table origin (AFTO) 93 which, when joined with the AFX at 91 by an adder operation at 94 gives the real address of an AFTE 95 in the ASN first table. The AFTE 95 includes an ASN-second-table origin (ASTO) 96 which, when joined with the ASX 92 by the adder operation at 97, forms the real address of the ASTE 98 in the ASN second table 30, also discussed in connection with FIG. 2. Since the ASTE address 100 is located in the ETE 57 when CR0.15 is one, it may be used in place of the ASN translation described. Bit 12 of control register 14 (CR14.12) is an ASN-translation bit T 101. If CR14.12 is zero, neither the ASTE address 100 nor the ASN 90 can be used. If CR14.12 is one, either one or the other may be used, and, in the present implementation, it is unpredictable which is used. The AX 102 of ASTE 98 and the ASN 90 of ETE 57 are placed in control register 4 at 103 and 104, respectively, for PC-ss operations. The STD 105 of the ASTE 98 is placed in control register 1 at 106. If CR0.15=1, the ASTE address is placed in control register 5 at 107 as the PASTEO. If CR0.15=0, the LTD at 108 of ASTE 98 is placed in control register 5 at 107. It can thus be seen that the ASN translation of FIG. 17 provides for either DAS or MAS operations.

The PC-ss operation discussed in connection with FIGS. 15, 16 and 17 may be used to transfer control to a new address space for instruction fetching operations, thereby establishing the new address space as the primary address space. Typically, when the PC number, the entry-table entry and the linkage-table entry are established by a service provider, an AKM is specified for setting the authority of programs calling that PC number. If a calling program has the authority to enter the program defined by the entry-table entry, as determined by the ANDing operation 63 of FIG. 16, the PC operation may change the EAX stored in control register 8.

For example, the PC operation may also be used to call a system service to add a new ALE to one of the access lists 24 or 25, as discussed in connection with the access-list entry of FIG. 6. The service program can establish a new access-list entry and provide a new ALET for use in access register mode operations by the calling user. When an access-list entry is formed, the EAX from the callers control register 8 is placed in the ALE as the ALEAX. Once the ALE is created, the service program returns the ALET for that ALE to the user program. The ALET may then be stored, or passed to other address spaces, in any convenient manner for use in fetching or storing operands. The described authorization procedures prevent an unauthorized program from using an ALET.

Some access-list entries may be designated by their owners at the time of creation either as private entries to provide address space access only to the owner or an authorized user, or as public entries open to all users. In the case of public entries (P bit, bit 7, is zero), the ALE is open and free to be used by any program. If the P bit of the ALE is set to one, the ALE is to be used only by authorized programs. The control program provides facilities for adding entries to the AT of the associated address space if more than one EAX is to be allowed to use the ALE.

FIG. 18 is a diagrammatic illustration of the access-register translation with program authorization checks. When an ALET is used in an access register operation to fetch or store an operand, bits 0-6 of the ALET are examined at 115 to insure that the ALET is valid. If the P bit 116 in the ALET is 0, the access list is a DUAL, and if the P bit 116 is 1, the access list is a PSAL. If the access list is a DUAL, the effective ALD is fetched from the DUCT whose address is stored in control register 2. If the access list is a PSAL, the effective ALD is fetched from the primary ASTE (PASTE) whose address is stored in control register 5. The effective ALD includes an access list origin and an access list length (ALL). At 117, the ALEN is compared to the ALL to determine that the ALEN is not outside the bounds of the access list. If the ALEN passes this validity check, the effective access-list origin is joined with the ALEN by an adder operation at 119 to find the address of the ALE 120 in the access list 121. The invalid bit, bit 0 of the ALE 120, is checked at 121 to see if it is 0, thereby determining if the ALE 120 is valid. If the ALE 120 is valid, the ALESN 122 of the ALET is compared to the ALESN 123 of the ALE 120 at 124. If the ALESN 122 is equal to the ALESN 123, the ALET is still authorized to designate the ALE 120, and the ASTE address 125 is used to fetch the ASTE 126. The validity of the ASTE 126 is confirmed by checking the invalid bit 127 at 128. If the ASTE 126 is valid, the ASTESN 130 is compared with the ASTESN 131 at 132 to insure that the ALE 120 is still authorized to designate the ASTE 126. These checks complete the validity portion of the ART.

The authority of the calling program to access the address space is now checked. The first check is made at 135 to determine if the P bit 136 is 0. If the P bit 136 is 0, all programs are authorized to access the address space associated with the ALE, and no further checks are made. If the P bit 136 is 1, the ALEAX 137 is compared to the EAX 138 in control register 8 by the comparator 139. If the comparison at 139 is equal, then the program is specifically authorized to access the address space, and no further checks are made. If the comparison at 139 is not equal, then an ASN extended authorization check is made at 140. The ASN extended authorization check 140 is made by comparing the EAX in control register 8 with the authority table length (ATL) 141 to make sure that the EAX does not designate an entry outside of the bounds of the authority table. The EAX located in control register 8 is used as an index into the authority table whose origin is ATO 142. If the S bit in the authority table is set equal to 1 for that EAX, then the program is authorized to have access into the address space. If the program is authorized to have access to the address space, as described, the STD 144 is provided for the DAT operation at 145.

Figure 19A:
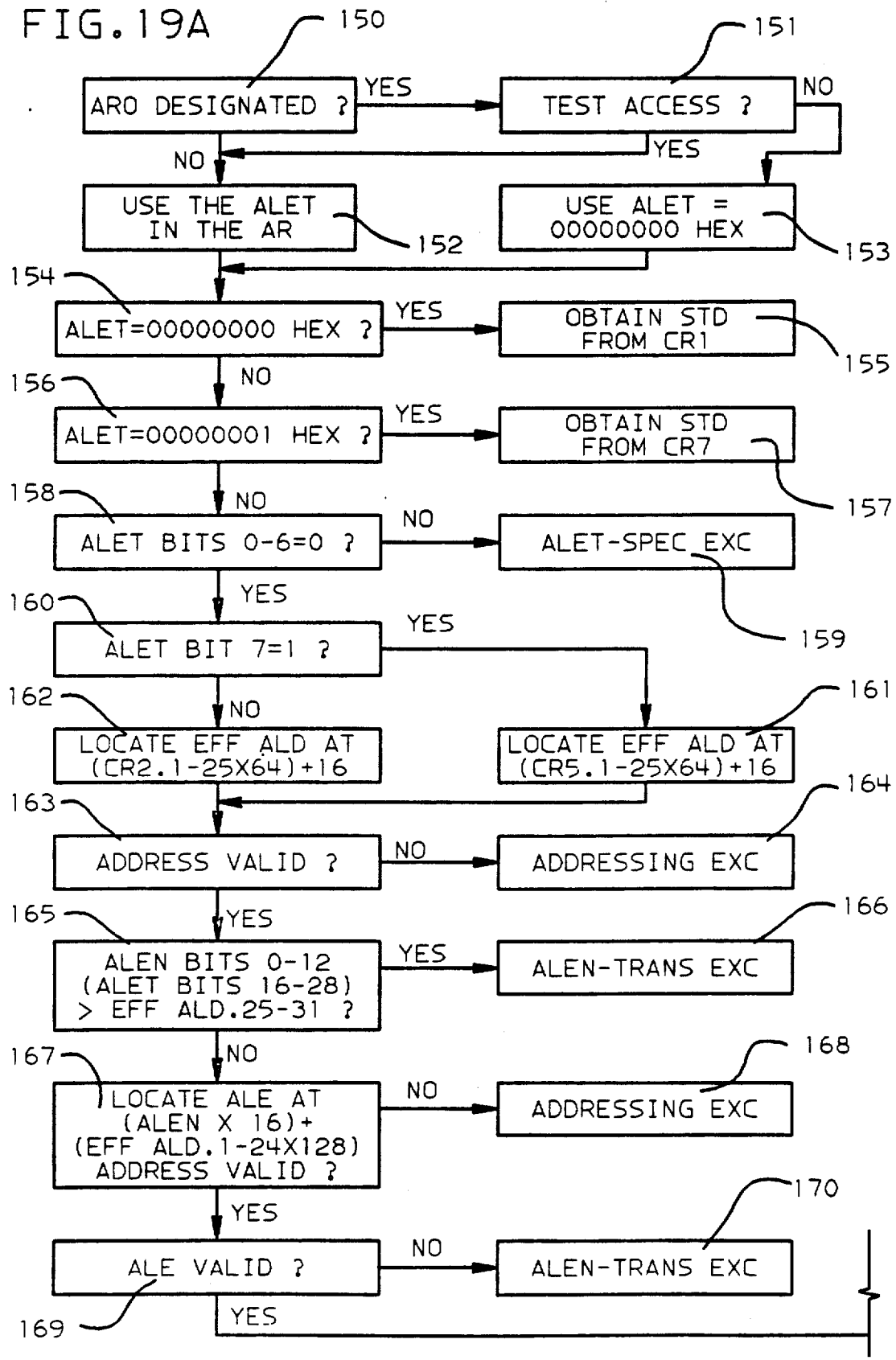
FIGS. 19A and 19B, when taken together, form a flow chart of an access register translation operation and exceptions.
Figure 19B:
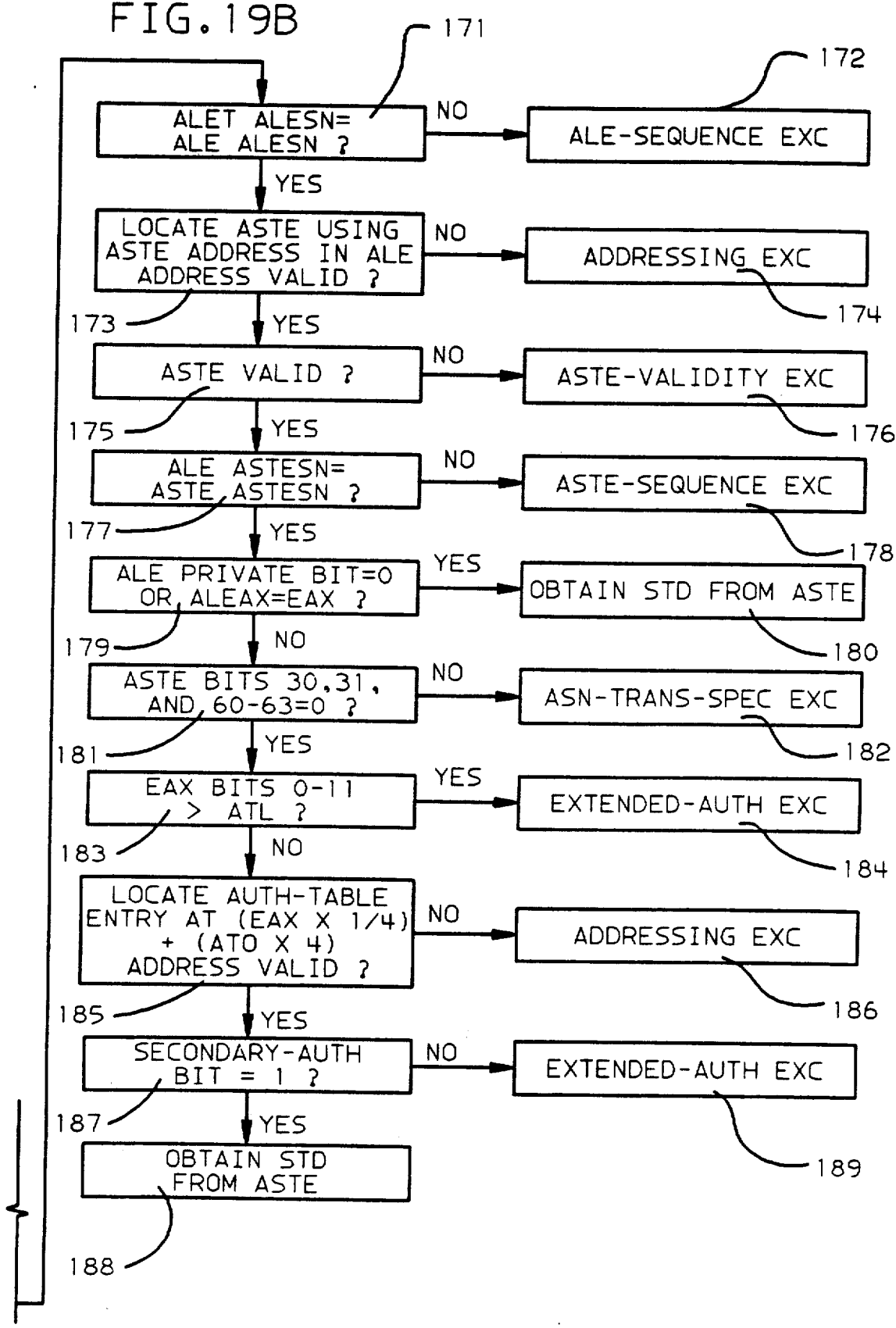

FIG. 19A and 19B, when taken together, form a flow chart of the access register translation steps and exceptions. When the ART logic is invoked, a check is made at 150 to determine if access register 0 has been designated. If access register 0 has been designated, a check is made at 151 to determine if the ART was invoked by a TEST ACCESS operation (to be described). If access register 0 was not designated, or if this is a TEST ACCESS operation, the ALET in the access register is designated for use at 152. If access register 0 is designated and this is not a TEST ACCESS operation, a 00000000 hex is assigned to the ALET at 153. A check is made at 154 to determine if the ALET is equal to 00000000 hex. If yes, the STD for the primary address space is obtained from control register 1 at 155. At 156, a check is made to determine if the ALET has a value of 00000001 hex. If yes, the STD for the secondary address space is obtained from control register 7 at 157. A check is made at 158 to determine if bits 0–6 of the ALET are equal to 0. If bits 0–6 are not equal to 0, the assigned value of the ALET is not valid, and an ALET specification exception is raised at 159 and operation is suppressed.

A check is made at 160 to determine if the ALET bit 7 is 1. If it is, the PASTEO entry in control register 5 is decoded at 161 and the effective ALD is fetched for the PSAL. If the ALET bit 7 is equal to 0, the DUCTO entry in control register 2 is decoded at 162, and the effective ALD is fetched for the DUAL. If the fetching address is not valid at 163, an addressing exception is raised at 164, and the operation is suppressed. If the address is valid at 163, a check is made at 165 to determine if the ALEN of the ALET is outside the bounds of the effective ALL (bits 25–31 of the effective ALD). If it is, an ALEN translation exception is raised at 166, and operation is nullified. If the answer at 165 is no, the ALE is located at 167, and a check is made to see if the ALE address is valid. If the ALE address is not valid, an addressing exception is raised at 168, and the operation is suppressed. If the address is valid at 167, the valid bit in the ALE is checked at 169 to see if the ALE is valid. If the ALE is not valid, an ALEN translation exception is recognized at 170, and the operation is nullified. If the ALE is valid at 169, the ALESN of the ALET is compared to the ALESN of the ALE at 171. If the comparison at 171 is not equal, an ALE sequence exception is recognized at 172, and the operation is nullified. If there is an equal compare at 171, the ASTE is located at 173 using the ASTE address in the ALE. A check is made to determine if the ASTE address is valid. If the address is not valid, an addressing exception is raised at 174, and the operation is suppressed. If the ASTE address is valid at 173, the validity bit of the ASTE is checked at 175 to determine if the ASTE is valid. If the ASTE is not valid, an ASTE validity exception is raised at 176, and the operation is nullified. At 177, the ASTESN of the ALE is compared with the ASTESN of the ASTE. If there is not an equal comparison at 177, an ASTE sequence exception is raised at 178, and the operation is nullified.

The previous blocks 163–178 thus determine if the entries obtained are valid. At 179, the private bit of the ALE, bit 7, is checked to see if it is equal to 0. Also at 179, the ALEAX entry in the ALE is compared to the EAX in control register 8. If either of the checks are equal, the STD for the operand is obtained from the ASTE of the address space, as shown at 180. When the private bit is 0, the program is authorized, and the authorization step of the access register translation is completed. When the private bit is 1 but the ALEAX is equal to the EAX, the program is also authorized, and the authorization step of the access register translation is completed.

If the program is not yet authorized at 179, then at 181, the validity of the ASTE is checked by determining if the ASTE bits 30, 31, and 60–63 are 0. If not, an ASN translation specification exception is raised at 182, and the operation is suppressed. At 183, the value of the EAX bits 0–11 in control register 8 is compared against the length of the authority table to make sure that the EAX does not designate an entry outside of the bounds of the authority table. If the comparison at 183 is yes, an extended authorization exception is raised at 184, and the operation is suppressed. If the EAX does not designate an entry outside of the bounds of the authority table, the associated EAX entry is located in the authority table at 185. If the address of the authority table entry is not valid, an addressing exception is raised at 186, and the operation is suppressed. An extended authorization check is made at 187 by determining if the secondary authorization bit (S bit) of the authority-table entry located at 185 is equal to 1. If the check at 187 is yes, the program is one of those authorized by the authority table associated with the address space, and the STD for the address space is obtained from the ASTE at 188. If the comparison at 187 is no, the program is not authorized, and an extended authority exception is recognized at 189, and the operation is nullified.

The MAS facility includes a TEST ACCESS REGISTER (TAR) instruction for performing the mentioned test access operation. TEST ACCESS REGISTER has the following format:

TAR A1, R2

The ALET specified as being in the access register of the first operand A1 is checked for ALET translation exceptions using the EAX in the general register specified by the second operand R2. As shown in FIGS. 19A and 19B, the TEST ACCESS REGISTER instruction, as determined in 151 of FIG. 19A, causes an ART operation to be performed. The TAR instruction returns the following results of the test in the PSW condition code (CC) see FIG. 4.

0 = ALET specified is 0 and is valid for access.
1 = ALET specified is not 0 or 1, is in the DUAL addressed by means of control register 2, and is valid for access with the specified EAX.
2 = ALET specified is not 0 or 1, is in the PSAL addressed by means of control register 5, and is valid for access with the specified EAX.
3 = ALET specified either is 1 or is invalid for access with the specified EAX.

The ability to test an ALET for authorization exceptions using an input EAX allows the program to determine if the ALET references the callers PASN (ALET=0), or if the ALET references the DUAL, or if the ALET references the caller's PSAL. This allows the program to be independent of the internal format of the ALET.

When the TAR instruction is used and ART is performed, an ALB entry is created. Thus, when the ALET in the AR is used, the ALB contains the entry provided no exception occurred during ART.

Figure 20:
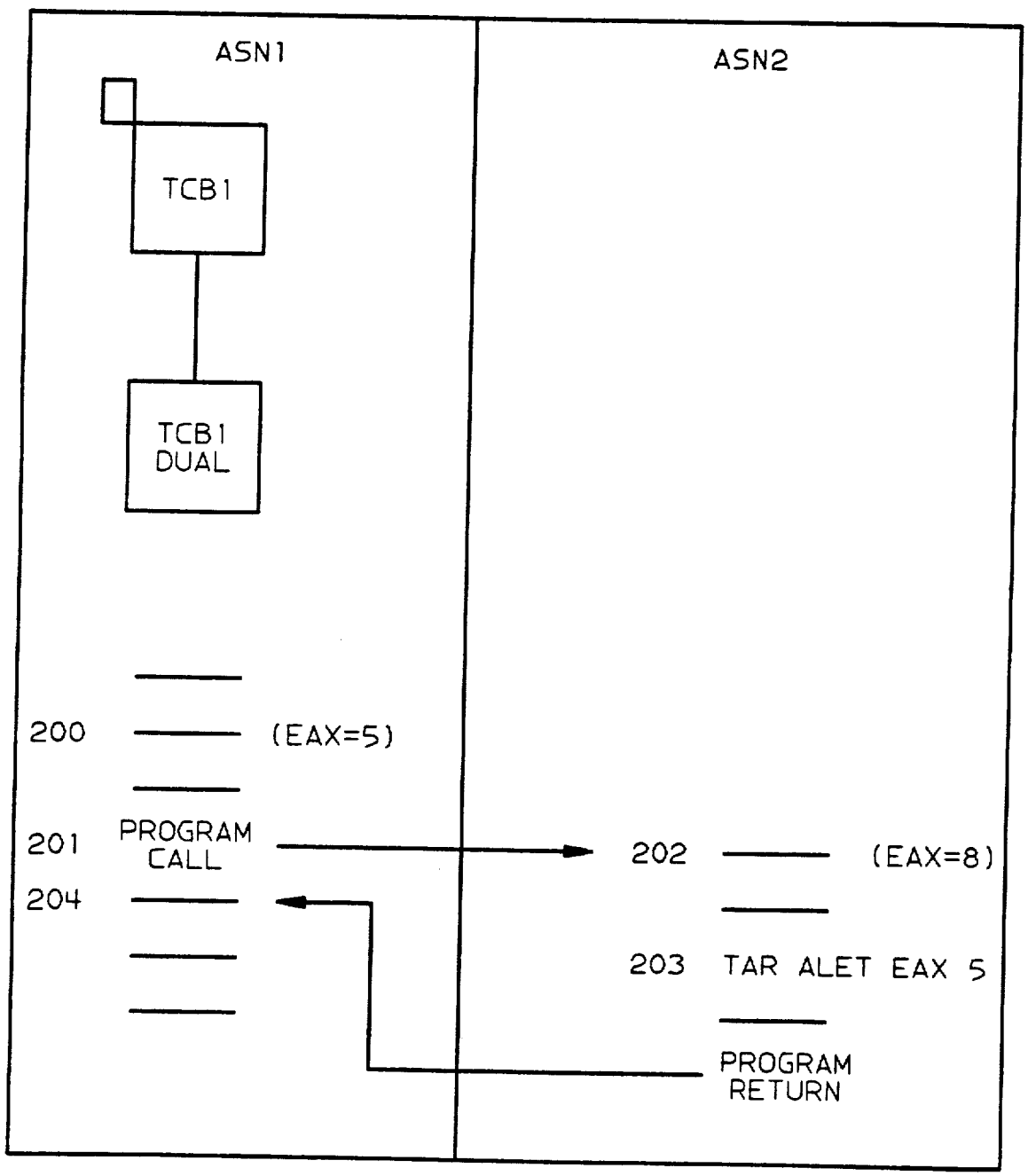
FIG. 20 is an illustration of the use of the TEST ACCESS REGISTER instruction for use with the MAS facility.

FIG. 20 shows an example use of the TAR instruction. A dispatchable unit task control block TCB1, while executing at 200, has an EAX of 5. This EAX allows the program to use specific entries on its DUAL for TCB1. At 201, the program makes a program call to a program which resides in address space ASN2, and passes an ALET which the program in ASN2 must use. At 202, the program in ASN2 is executed with an EAX = 8, which is different from its caller's EAX. If at 202, the program used the ALET provided by the calling program, there could be a system integrity problem.

The calling program may not have had the EAX authority to use the ALET, but the ASN2 program does. The ASN2 program must perform a validity check to determine if the caller had the authority to use the ALET that it passed. At 203, the program in ASN2 makes the validity check using the TAR instruction with the input ALET and the EAX=5 of the caller. The caller's EAX is obtained from the linkage stack entry made on the program call to ASN2. If the TAR instruction gives a condition code which states that the caller was authorized to use the ALET, then the ASN2 program will continue to perform its function. If the caller was not authorized, then the ASN2 program will either ABEND the caller or return to the caller with a return code which indicates that the call was not successful. When control returns at 204 by means of a RETURN instruction, the callers EAX (EAX=5) is restored from the stack, and the ASN1 program continues to execute with that EAX.

The ALET validity check function is needed quite frequently. In the example of FIG. 20, it is needed on every call to the program in ASN2. This function could be provided by an operating system service routine; however, the performance overhead would be excessive. If the TAR function is not provided, programs which must reference a caller's ALET and change the EAX may need to use two PC instructions. The first PC would not change the EAX and the caller's parameters would be referenced with the callers EAX. Later, a second PC would be executed to provide the new EAX for the called program to use. The TAR function thus provides a more efficient performance. It will be understood that, although the example of FIG. 20 shows the TAR instruction used with an ALET on the DUAL, the TAR instruction can be used with ALETs on both the DUAL and the PSAL.

| | GLOSSARY |
|---|---|
| AKM | Authorization key mask |
| AR | Access Register - each access register is associated with a GPR. |
| ART | Access-Register Translation - A method of associating a STD - segment table designation with an access register. |
| AX | Authorization Index |
| ALB | ART Lookaside Buffer - ART occurs each time an AR is designated by a B field storage operand reference in a GPR. |
| ALE | Access-List Entry |
| ALEAX | Access-List Entry authorization index |
| ALEN | Access-List Entry Number - Bits 16-31 of the ALET are the access list entry number of the designated ALE. |
| ALL | Access-List Length - Stored in a control register as a predetermined number and can at most permit 1024 access list entries. |
| ALET | Access-List Entry Token - An ALET designates an entry in an access list. |
| ALESN | Access-List-Entry Sequence Number - Bits 8-15 of the ALET and of the ALE. |
| ASN | Address Space Number - Represents an address space. |
| ASTE | ASN-Second-Table Entry - This is an extension of the 370/XA ASTE shown in the prior art and includes an I bit and an STD. |
| ASTESN | ASTE Sequence Number - The ASTESN in the ALE is tested for equality with ASTESN in ASTE. |
| ATL | Authority-Table Length. |
| DAS | Dual Address Space |
| DAT | Dynamic Address Translation - Uses an STD to convert virtual address to real storage addresses. |
| DUAL | Dispatchable-Unit Access List |
| DUALD | DUAL designation consisting of the real origin |

| | -continued |
|---|---|
| | GLOSSARY |
| | and length of the DUAL |
| DUCT | Dispatchable-Unit Control Table - contains DUALD and specified by CR2 |
| EAX | Extended authorization index |
| EKM | Entry key mask |
| ETE | Entry-Table Entry |
| GPR | General Purpose Register for containing operands and addresses |
| LTD | Linkage Table Designation |
| MAS | Multiple Address Space |
| P Bit | Bit in ALET that selects between DUAL and PSAL; Bit in ALE that indicates whether ALE is public or private. |
| PASTE | Primary-ASN-second-table entry - contains PSAL and LTD |
| PC-cp | PROGRAM CALL to current primary |
| PC-ss | PROGRAM CALL with space switching |
| PKM | PSW-key mask |
| PSAL | Primary-Space Access List |
| PSALD | PSAL Designation consisting of the real origin and length found in the primary ASTE |
| PSTD | Primary Segment-Table Designation |
| PSW | Program Status Word |
| SSTD | Secondary Segment-Table Designation |
| STD | Segment-Table Designation |

While the invention has been particularly shown and described with references to preferred embodiments thereof, it will be understood by those skilled in the art that the foregoing and other changes in form and details may be made therein without departing from the spirit and scope of the invention.

Having thus described our invention, what we claim as new and desire to secure by Letters Patent is:

1. In a computer system having a central processor, a main memory, and an operating system operating said central processor for executing programs having instructions for processing data, each instruction having an operand field, and said main memory being allocated into a plurality of address spaces containing data to be processed by said programs, a program authorization mechanism authorizing a program to access data in one of said address spaces comprising:

a plurality of access registers, each access register for containing a number having the value of an access-list-entry token (ALET) designating one of said address spaces for associating each access register and its ALET with one of said address spaces, said access registers being addressable by the contents of the operand field of a program instruction;

access-register translation (ART) means in said central processor having an input for receiving the ALET of the access register designated by the contents of the operand field of the instruction and, responsive thereto, providing an address into the address space associated with said ALET;

address translating means in said central processor having an input for receiving the contents of the operand field of the program instruction being executed by said central processor, and an input for receiving the address from said ART means, said address translating means for translating the contents of the operand field to a logical address and combining said logical address with the address from the ART means to form a real address in the address space designated by the ALET;

said ART means further including authorizing means for authorizing data access to the address space designated by the ALET by the program being executed by said central processor;

an access list having a plurality of access-list entries in said main memory, each access-list entry being associated with one of said address spaces, said access list being associated with selected programs;

an access-list entry number (ALEN) in each ALET, said ALEN designating one of said access-list entries;

a P bit in each of said access-list entries, said P bit being assigned a first value when the address space associated with the access-list entry is open to all of said selected programs, and being assigned a second value when the address space associated with the access-list entry is open to only authorized programs;

first access allowing means in said ART for determining the value assigned to said P bit, said first access allowing means allowing continued execution of the instruction for allowing access to said designated address space by said program being executed by said central processor when said P bit has its first value;

a control register for storing an extended authorization index (EAX) value for said program being run by said operating system;

an access list extended authorization index (ALEAX) field in each of said access-list entries for storing an ALEAX value; and second access allowing means in said ART means for comparing the EAX value with an ALEAX when said P bit has its second value, said second access allowing means allowing access to said designated address space by said program being executed by said central processor when said EAX value is equal to the ALEAX value of the access-list entry designated by the ALEN of the ALET in the access register addressed by the contents of said operand field.

2. The program authorization mechanism of claim 1 further comprising:

an authority table (AT) in said main memory associated with each address space, each AT having an AT entry for each EAX in use;

an S bit in each AT entry, said S bit being assigned a first value when the EAX of that AT entry is authorized access to the address space associated with that AT, and being assigned a second value when the EAX of that AT entry is not authorized access to the address space associated with that AT; and third access allowing means in said ART for examining the value of the S bit when said P bit has its second value and said EAX is not equal to said ALEAX, said third access allowing means allowing access to said designated address space by said program being executed by said central processor when the S bit for the AT entry of the AT associated with the designated address space for the EAX value stored in said control register has said first value.

3. The program authorization mechanism of claim 2 further comprising:

PROGRAM CALL means in said operating system for changing the EAX value stored in said control register.

4. The program authorization mechanism of claim 3 further comprising:

saving means in said main memory for saving the EAX value stored in said control register before said EAX value is changed by said PROGRAM CALL means; and RETURN means in said operating system for restoring said EAX value from said saving means to said control register.

5. The program authorization mechanism of claim 1 further comprising:

a plurality of ASN-second-table entries, each ASN-second table entry (ASTE) corresponding to a selected address space;

an ASTE address in each access-list entry for associating the access-list entry with the ASTE;

an ASTE sequence number (ASTESN) in each ASTE, said ASTESN having a selected value;

an ASTESN in each access-list entry whose value is set to the value of the ASTESN in the ASTE at the time the access-list entry was associated with the ASTE; and authority withdrawal means in said ART means for comparing the value of the ASTESN of the access-list entry to the value of the ASTESN of its corresponding ASTE, and preventing the further execution by said central processor of a program which otherwise has data access when said values do not match.

6. In a computer system having a central processor, a main memory, and an operating system operating said central processor for executing programs having instructions for processing data, each of said instructions having an operand field, said main memory being allowed into a plurality of address spaces containing data to be processed by said programs, a program authorization mechanism authorizing a program to access data in one of said address spaces comprising:

a control register for storing an extended authorization index (EAX) value for the program being executed by said central processor;

access-list means having a plurality of access-list entries in said main memory, each access-list entry being associated with one of said address spaces;

an access-list extended authorization index (ALEAX) value in each of said access-list entries for controlling access to the address space associated with each access-list entry;

access-register translation (ART) means in said central processor having an address space locating means including an input for receiving the contents of said instruction operand field, said address space locating means for locating an entry in said access-list means corresponding to the contents of said instruction operand field thereby locating its associated address space, said ART means further having a first access allowing means for comparing the EAX value in said control register with the ALEAX of the located entry in said access-list, said first allowing means allowing continued execution of the program being executed, thereby allowing access to the address space associated with said located access-list entry when the EAX in said control register is equal to said ALEAX of said located access-list entry;

an entry table means having entry-table entries in said main memory for storing entry data, each entry-table entry being associated with one of said programs;

PROGRAM CALL means for changing said EAX value to a changed EAX value such that the program being executed by said central processor is run under said changed EAX value, said PROGRAM CALL means transferring control from a calling program to a called program; and authorization changing means in said PROGRAM CALL means and connected to said entry-table entries, said authorization changing means for changing the authorization of said called program called by said calling program responsive to entry data in the entry-table entry associated with said called program.

7. The program authorization mechanism of claim 6 wherein each of said entry-table entries includes means for storing an entry EAX (EEAX) in said entry data; and said program authorization mechanism further comprises:

EAX changing means in said authorization changing means for replacing said EAX value in said control register with said EEAX in the entry-table entry associated with said called program; and extended-authorization-index control means in the entry-table entry data associated with said called program, said extended-authorization-index control means controlling said EAX changing means and having a first value if said EAX changing means is to replace said EAX with said EEAX and having a second value if said EAX changing means is not to replace said EAX with said EEAX.

8. The program authorization mechanism of claim 7 wherein said entry-table entry associated with said called program includes an entry key mask (EKM) in said entry data, said program authorization mechanism further comprising:

a second control register for storing a PSW key mask (PKM), said PKM controlling access by said PROGRAM CALL means to the entry-table entry associated with said called program;

OR means in said authorization changing means for ORing said EKM into said PKM in said second control register to change said PKM in said second control register such that said changed PKM is hierarchical;

replacement means in said authorization changing means for replacing said PKM in said second control register with said EKM such that said replaced PKM is nonhierarchical; and PSW-key-mask control means in each of said entry-table entries for controlling said authorization changing means, said PSW-key-mask control means having a first value when said OR means is to be used by said PROGRAM CALL means and having a second value when said replacement means is to be used by said PROGRAM CALL means.

9. The program authorization mechanism of claim 8 wherein said calling program is in a first address space and said called program is in a second address space, said program authorization mechanism further comprising:

preventing means in said authorization changing means for preventing said called program from having access to said first address space.

10. The program authorization mechanism of claim 9 wherein said preventing means comprises:

a third control register for storing a secondary address space number (SASN) identifying a secondary address space;

a fourth control register for storing an old primary address space number (PASN) identifying said first address space as the old primary address space;

a fifth control register for storing a secondary segment table designation (SSTD) for locating said secondary address space in said main memory;

a sixth control register for storing an old primary segment table designation (PSTD) for locating said old primary address space in said main memory;

primary establishing means in said PROGRAM CALL means for establishing a new PASN and a new PSTD for identifying and locating in main memory, respectively, said second address space as the new primary address space;

equal setting means in said PROGRAM CALL means for setting a new SASN and a new SSTD in said third and fifth control register, respectively, equal to said old PASN and old PSTD stored in said forth and sixth control registers, respectively, or setting said new SASN and new SSTD equal to said new PASN and new PSTD, respectively; and secondary-ASN control means in each of said entry-table entries for controlling said equal setting means, said secondary-ASN control means having a first value when the new SASN and new SSTD are to be set equal to the old PASN and old PSTD, respectively, thereby allowing said called program to have access to said first address space of said calling program, and having a second value when the new SASN and new SSTD are to be set equal to the new PASN and new PSTD, respectively, thereby preventing said called program from having access to said first address space of said calling program.

11. The program authorization mechanism of claim 10 further comprising:

saving means in said memory for saving the values of EAX, PKM, PASN and SASN as they existed in said control registers before any one has been changed by said authorization changing means; and RETURN MEANS in said operating system for restoring the values of EAX, PKM, PASN and SASN as they were saved in said saving means, said restoring occurring after the called program has been run by said central processor under at least one changed EAX, PKM, PASN or SASN value.

12. In a computer system having a central processor, a main memory, and an operating system operating said central processor for executing programs having instructions for processing data, each of said instructions having an operand field, said main memory being allocated into a plurality of address spaces containing data to be processed by said programs, a program authorization mechanism authorizing a program to access data in one of said address spaces comprising:

a control register for storing an extended authorization index (EAX) value for the program being executed by said central processor;

access-list means having a plurality of access-list entries in said main memory, each access-list entry being associated with one of said address spaces;

an access-list extended authorization index (ALEAX) value in each of said access-list entries for controlling access to the address space associated with each access-list entry;

access-register translation (ART) means in said central processor having an address space locating means including an input for receiving the contents of said instruction operand field, said address space locating means for locating an entry in said access-list means corresponding to the contents of said instruction operand field thereby locating its associated address space, said ART means further having a first access allowing means for comparing the EAX value in said control register with the ALEAX of the located entry in said access-list, said first allowing means allowing continued execution of the program being executed, thereby allowing access to the address space associated with said located access-list entry when the EAX in said control register is equal to said ALEAX of said located access-list entry;

an authority table (AT) in said main memory associated with each of said address spaces, each of said ATs having a plurality of AT entries, one AT entry for each EAX value in use, each AT entry further having an S indicator having a first value when the EAX value is authorized to have access to the associated address space and a second value when the EAX value is not authorized to have access to the associated address space; and second access allowing means in said ART means for allowing access to the address space associated with said selected access-list entry when the S indicator for the AT entry of said EAX value in said control register has its first value.

13. The program authorization mechanism of claim 6 wherein each access-list entry includes a private indicator for the associated address space, said private indicator having a first value when all programs are allowed to have data access to said associated address space and having a second value when only authorized programs are allowed to have data access to said associated address space, and third access allowing means in said ART means for examining said private indicator of said selected access-list entry, said third access allowing means allowing access to the address space associated with said selected access-list entry when said private indicator of said selected access-list entry has said first value.

14. The program authorization mechanism of claim 13 wherein said private indicator is a P bit having a first value of 0 and a second value of 1.

15. The program authorization mechanism of claim 12 wherein each S indicator is an S bit having a first value of 1 and a second value of 0.

16. The program authorization mechanism of claim 12 wherein said AT is indexable by the EAX values in use.

17. The program authorization mechanism of claim 12 further comprising:

a plurality of ASN-second-table entries (ASTEs) in said main memory, one ASTE for each of said address spaces;

an ASTE address in each of said access-list entries, said ASTE address being the address in main memory of the ASTE of said address space associated with said access-list entry; and an authority-table origin (ATO) in each of said ASTEs, said ATO being the main memory address of the origin of the AT of the address space associated with said access-list entry.

18. The program authorization mechanism of claim 17 further comprising:

an ASTE sequence number (ASTESN) in each of said ASTEs, the ASTESN being assigned to said ASTE at the time the ASTE is associated with one of said address spaces;

an access-list ASTESN in each of said access-list entries, the access-list ASTESN being written into each access-list entry at the time the access-list entry is created; and ASTESN comparing means in said ART means for denying access to the associated address space if the ASTESN does not equal the access-list ASTESN such that authority may be withdrawn from all current access-list entries addressing a selected ASTE by changing the ASTESN in said selected ASTE.

19. The program authorization mechanism of claim 12 further comprising:

a test instruction in said operating system having the format

TAR A1,R2 wherein A1 indicates the access-list entry to be used for the test and R2 indicates the EAX to be used for the test, said test instruction testing if the value of the EAX indicated by R2 is authorized to use the address space associated with the access-list entry indicated by A1.

20. The program authorization mechanism of claim 12 further comprising:

a plurality of access registers, each access register for containing an access-list-entry token (ALET) designating one of said access-list entries, each of said access registers being addressable by an operand of selected ones of said instructions such that said selected instructions access the address space associated with the access-list entry designated by the ALET of the addressed access register via said ART means.

21. The program authorization mechanism of claim 20 wherein said access list means comprises a plurality of access lists, and said ALET includes an access-list designation specifying one of said access lists to be used and an access-list entry number designating which entry of said one access list is to be used by said ART means.

22. The program authorization mechanism of claim 21 wherein said plurality of access lists are divided by tasks being performed by the programs being executed by said central processor.

23. In a computer system having a central processor, a main memory, and an operating system operating said central processor for executing programs having instructions for processing data, said main memory being allocated into address spaces containing data to be processed by said programs, a program authorization method comprising the steps of:

placing in a selected access register from a plurality of access registers, an access-list entry token (ALET) designating one of said address spaces;

executing one of said instructions, said one instruction having an operand addressing said selected access register;

establishing an access list having a plurality of access-list entries in said main memory, each access-list entry being associated with one of said address spaces;

placing an access list entry number (ALEN) in each ALET, said ALEN designating one of said access-list entries;

placing a P bit in each of said access list entries, said P bit having a first value when the address space associated with the access-list entry is open to all programs, and a second value when the address space associated with the access-list entry is open to only authorized programs;

storing in a control register an extended authorization index (EAX) value for said program being run by said operating system;

placing an access-list extended authorization index (ALEAX) value in each of said access-list entries; and authorizing access to the address space designated by the ALET in said selected access register by the program being executed by said central processor when the P bit of said designated access-list entry has its first value or said EAX is equal to the ALEAX of said designated access-list entry.

24. The program authorization method of claim 23 comprising:

prior to said authorizing step, further performing the steps of:

establishing an authority table (AT) in said main memory associated with each address space, each AT having an AT entry for each EAX in use; and placing an S bit in each AT entry, said S bit having a first value when the EAX of that AT entry is authorized access to the address space associated with that AT and a second value when the EAX of that AT entry is not authorized access to the address space associated with that AT; and said authorizing step further comprises allowing access to said designated address space by said program being executed by said central processor when the S bit for the AT entry of the AT associated with the designated address space for the EAX value stored in said control register has said first value.

25. The program authorization method of claim 24 further comprising the steps of:

changing the EAX value stored in said control register; and repeating the steps of claim 23 thereby authorizing access by the program being executed by said operating system under said changed EAX value.

26. The program authorization mechanism of claim 25 further comprising:

prior to said changing the EAX value step, the step of saving in main memory the EAX value stored in said control register; and after the final authorizing step, the step of restoring said EAX value from said main memory to said control register.

27. The program authorization method of claim 23 comprising:

prior to said authorizing step, further performing the steps of:

establishing in said main memory an ASN-second-table entry (ASTE) associated with each address space;

placing an ASTE address in each access-list entry;

assigning an ASTE sequence number (ASTESN) value in each ASTE; and placing an access-list ASTESN value in each access-list entry, said access-list ASTESN value being the same as the ASTESN value of the respective ASTE; and said authorizing step further comprises withdrawing authority to access an address space when the access-list ASTESN value of said designated access-list entry does not match the ASTESN value of the respective ASTE.

28. In a computer system having a central processor, a main memory, and an operating system operating said central processor for executing programs having instructions for processing data, said main memory being allocated into address spaces containing data to be processed by said programs, a program authorization method comprising the steps of:

storing in a controlled register, a changed extended authorization index (EAX) value for the program to be run by said central processor;

associating an access-list entry in said main memory with each one of said address spaces;

storing an access-list extended authorization index (ALEAX) value in each of said access-list entries for controlling program access to the associated address space;

selecting an access-list entry for processing data;

allowing program access to the address space associated with said selected access-list entry when said changed EAX value stored in said control register is equal to said ALEAX of said selected access-list entry;

storing in an entry-table entry in said main memory, an entry key mask (EKM) for a program associated with said entry-table entry;

changing a PSW-key mask (PKM) value stored in a second control register by performing one of ORing said EKM into said PKM value to form a changed PKM or replacing said PKM value in said second control register with said EKM to form said changed PKM; and controlling subsequent access to said entry-table entry with said changed PKM value in said second control register.

29. The program authorization method of claim 28 further comprising:

prior to said changing the PKM value step, saving said EAX and said PKM values in said main memory; and further performing the step of restoring said EAX and said PKM values to said control registers with said EAX and said PKM values saved in said main memory, said step of restoring to occur during the execution of a PROGRAM RETURN by said central processor.

30. The program authorization method of claim 29 further comprising the steps of:

calling with a calling program in a first address space, a called program in a second address space; and preventing said called program from having access to said first address space.

31. The program authorization method of claim 28 further comprising:

prior to said selecting an access-list entry step, the step of storing a private indicator in each access-list entry, said private indicator having a first value when all programs are allowed to have access to said associated address space, and having a second value when only authorized programs are allowed to have access to said associated address space; and said allowing access step further comprises allowing access to the address space associated with said selected access-list entry when said private indicator of said selected access-list entry has said first value.

32. In a computer system having a central processor, a main memory, and an operating system operating said central processor for executing programs having instructions for processing data, said main memory being allocated into address spaces containing data to be processed by said programs, a program authorization method comprising the steps of:

storing in a controlled register, an extended authorization index (EAX) value for the program to be run by said central processor;

associating an access-list entry in said main memory with each one of said address spaces;

storing an access-list extended authorization index (ALEAX) value in each of said access-list entries for controlling program access to the associated address space;

establishing an authority table (AT) in said main memory associated with each of said address spaces, each of said ATs having a plurality of AT entries, one AT entry for each EAX value in use, each AT entry further having an S indicator having a first value when the EAX value is authorized to have access to the associated address space and a second value when the EAX value is not authorized to have access to the associated address space;

selecting an access-list entry for processing data; and allowing program access to the address space associated with said selected access-list entry when said EAX value stored in said control register is equal to said ALEAX of said selected access-list entry or the S indicator for the respective AT entry of said EAX value in said control register has its first value.

33. The program authorization method of claim 32 comprising:

prior to said selecting an access-list entry step, further performing the steps of:

establishing in said main memory, a plurality of ASN-second-table entries (ASTEs), one ASTE for each of said address space;

assigning an ASTE sequence number (ASTESN) in each of said ASTEs; and writing an access-list ASTESN in each access-list entry whose value is the same as the ASTESN of the respective ASTE; and said allowing access step further comprises withdrawing authority to access the associated address space if said access-list ASTESN of said selected access-list entry does not equal the ASTESN of the respective ASTE.

34. In a computer system having a central processor, a main memory, and an operating system operating said central processor for executing programs having instructions for processing data, said main memory being allocated into a plurality of address spaces containing programs to be executed under the operating system in said address spaces and data to be processed by said programs, a program authorization mechanism for authorizing program access and data access to said address spaces comprising:

a control field for containing an authorization for a program executing under said operating system to call other programs for execution;

data access means having an input for receiving program instructions, said data access means having address translating means for translating operands in said program instructions into real addresses for accessing data at said real addresses in a specified address space for data processing by said instructions;

access list means having a plurality of access-list entries, each access-list entry corresponding to a selected one of said address spaces for controlling data access of a program by said operating system, each of said access-list entries associated with a data authorization indicating the authorization needed for program access to data in the corresponding address space;

entry table means having a plurality of entry-table entries, each entry-table entry corresponding to a selected one of said address spaces for controlling the execution of a program by said operating system, each of said entry-table entries associated with a program authorization indicating the authorization needed for program execution;

control transfer means in said operating system for transferring program control from a calling program in a first address space to a called program in a second address space;

first authorization means in said operating system for providing access by said data access means to said specified address spaces by only those programs executing under at least the data authorization associated with the access-list entry corresponding to said specified address space; and second authorization means in said operating system for providing access to said first and second address spaces by only those programs executing under at least the program authorization associated with the entry-table entries corresponding to said first and second address spaces.

35. The program authorization mechanism of claim 34 further comprising:

data authorization changing means in said first authorization means for changing the data authorization of a specified program to a changed data authorization.

36. The program authorization mechanism of claim 35 wherein said data authorization changing means changes the value of said data authorization to one of a greater or lesser value such that said data authorization may be one of hierarchical or nonhierarchical, respectively.

37. The program authorization mechanism of claim 36 further comprising:

saving means in said main memory and connected to said data authorization changing means for saving said data authorization value before it is changed by said data authorization changing means; and PROGRAM RETURN means for restoring the value of said data authorization from said saving means.

38. The program authorization mechanism of claim 37 further comprising program authorization changing means in said second authorization means for changing the program authorization of a specified program to a changed program authorization.

39. The program authorization mechanism of claim 38 wherein said program authorization changing means changes the value of said program authorization to one of a greater or lesser value such that said program authorization may be one of hierarchical or nonhierarchical, respectively.

40. The program authorization mechanism of claim 39 wherein said saving means includes means for saving said program authorization before it is changed by said program authorization changing means; and said PROGRAM RETURN means includes means for restoring the value of said program authorization from said saving means.

41. The program authorization mechanism of claim 40 wherein said second authorization means includes preventing means for preventing a program executing in said second address space from having access to said first address space.

42. The program authorization mechanism of claim 41 wherein said entry table means has at least one entry-table entry associated with each program to be executed by said central processor, each of said entry-table entries having storage means for storing said changed data authorization, a value for replacing or modifying said program authorization for forming said changed program authorization, and control means for controlling said data authorization changing means and said program authorization changing means when said entry-table entry is selected; and PROGRAM CALL means connected to said entry-table means and controlling said data authorization changing means and said program authorization changing means, said PROGRAM CALL means for changing the data authorization and program authorization responsive to the controls in a selected entry-table entry.

43. The program authorization mechanism of claim 42 wherein said control means further comprises PSW key changing means for giving access to fetch protected code of the next instruction.

44. The program authorization mechanism of claim 36 further comprising:

test means connected to said first authorization means for testing the data authorization of a program without gaining access to said specified address spaces.

45. In a computer system having a central processor, a main memory, and an operating system operating said central processor for executing programs having instructions for processing data, said main memory being allocated into address spaces containing programs to be executed under said operating system in said data spaces, a program authorization mechanism comprising:

a control field for containing an authorization for a program executing under said operating system to call other programs for execution;

entry-table means having a plurality of entry-table entries, each entry-table entry corresponding to a selected one of said address spaces for controlling the execution of a program by said operating system, each of said entry-table entries associated with a program authorization indicating the authorization needed for program execution;

control transfer means in said operating system for transferring program control from a calling program in a first address space to a called program in a second address space;

authorization means in said operating system for providing access to said first and second address spaces by only those programs executing under at least the program authorization associated with the entry-table entries corresponding to said first and second address spaces;

authorization changing means in said authorization means for changing the value of said program authorization to one of a greater or lesser value such that said program authorization may be one of hierarchical or nonhierarchical, respectively;

saving means in said main memory for saving said program authorization before it is changed by said program authorization changing means; and PROGRAM RETURN means for restoring the value of said program authorization from said saving means; said authorization means including preventing means for preventing a program executing in said second address space from having access to said first address space.

46. The program authorization mechanism of claim 45 wherein said entry table means has at least one entry-table entry associated with each program to be executed by said central processor, each of said entry-table entries having storage means for storing a value for replacing or modifying said program authorization for forming said changed program authorization, and control means for controlling said authorization changing means when said entry-table entry is selected; and PROGRAM CALL means connected to said entry-table means and controlling said authorization changing means, said PROGRAM CALL means for changing the program authorization responsive to the controls in a selected entry-table entry.

47. The program authorization mechanism of claim 46 wherein said entry-table entry associated with said called program includes an entry key mask (EKM) in said entry data, said program authorization mechanism further comprising:

a first control register for storing a PSW key mask (PKM), said PKM controlling access by said PROGRAM CALL means to the entry-table entry associated with said called program;

OR means in said authorization changing means for ORing said EKM into said PKM in said first control register to change said PKM in said first control register such that said changed PKM is hierarchical;

replacement means in said authorization changing means for replacing said PKM in said first control register with said EKM such that said replaced PKM is nonhierarchical; and PSW-key-mask control means in each of said entry-table entries for controlling said authorization changing means, said PSW-key-mask control means having a first value when said OR means is to be used by said PROGRAM CALL means and having a second value when said replacement means is to be used by said PROGRAM CALL means.

48. The program authorization mechanism of claim 47 wherein said preventing means comprises:

a second control register for storing a secondary address space number (SASN) identifying a secondary address space;

a third control register for storing an old primary address space number (PASN) identifying said first address space as the old primary address space;

a fourth control register for storing a secondary segment table designation (SSTD) for locating said secondary address space in said main memory;

a fifth control register for storing an old primary segment table designation (PSTD) for locating said old primary address space in said main memory;

primary establishing means in said PROGRAM CALL means for establishing a new PASN and a new PSTD for identifying and locating in main memory, respectively, said second address space as the new primary address space;

equal setting means in said PROGRAM CALL means for setting a new SASN and a new SSTD in said second and fourth control register, respectively, equal to said old PASN and old PSTD stored in said third and fifth control registers, respectively, or setting said new SASN and new SSTD equal to said new PASN and new PSTD, respectively; and secondary-ASN control means in each of said entry-table entries for controlling said equal setting means, said secondary-ASN control means having a first value when the new SASN and new SSTD are to be set equal to the old PASN and old PSTD, respectively, thereby allowing said called program to have access to said first address space of said calling program, and having a second value when the new SASN and new SSTD are to be set equal to the new PASN and new PSTD, respectively, thereby preventing said called program from having access to said first address space of said calling program.

49. The program authorization mechanism of claim 48 wherein:

said saving means saves the values of EAX, PKM, PASN and SASN as they existed in said control registers before any one has been changed by said authorization changing means; and said RETURN MEANS restores the values of EAX, PKM, PASN and SASN as they were saved in said saving means, said restoring occurring after the called program has been run by said central processor under at least one changed EAX, PKM, PASN or SASN value.

* * * * *